(12) United States Patent
Uehara et al.

(10) Patent No.: US 10,378,414 B2
(45) Date of Patent: Aug. 13, 2019

(54) WORK VEHICLE

(71) Applicant: YANMAR CO., LTD., Osaka-shi, Osaka (JP)

(72) Inventors: Dai Uehara, Osaka (JP); Toshiyuki Miwa, Osaka (JP)

(73) Assignee: YANMAR CO., LTD., Osaka (JP)

( * ) Notice: Subject to any disclaimer, the term of this patent is extended or adjusted under 35 U.S.C. 154(b) by 7 days.

(21) Appl. No.: 15/521,755

(22) PCT Filed: Oct. 26, 2015

(86) PCT No.: PCT/JP2015/080135
§ 371 (c)(1),
(2) Date: Apr. 25, 2017

(87) PCT Pub. No.: WO2016/068089
PCT Pub. Date: May 6, 2016

(65) Prior Publication Data
US 2017/0260890 A1    Sep. 14, 2017

(30) Foreign Application Priority Data

Oct. 27, 2014  (JP) ................................ 2014-218760
Oct. 27, 2014  (JP) ................................ 2014-218761
Oct. 27, 2014  (JP) ................................ 2014-218762

(51) Int. Cl.
*B60K 35/00*  (2006.01)
*F01N 11/00*  (2006.01)
*F01N 3/023*  (2006.01)

(52) U.S. Cl.
CPC .............. *F01N 11/00* (2013.01); *B60K 35/00* (2013.01); *F01N 3/023* (2013.01); *F01N 2590/08* (2013.01); *Y02T 10/47* (2013.01)

(58) Field of Classification Search
USPC ......... 60/276, 277, 280, 286, 295, 297, 303, 60/311
See application file for complete search history.

(56) References Cited

U.S. PATENT DOCUMENTS

| 8,115,612 B2 | 2/2012 | Hirano et al. |
| 8,805,608 B2 * | 8/2014 | Matsumoto ........... E02F 9/2004 123/436 |

(Continued)

FOREIGN PATENT DOCUMENTS

| EP | 2107230 A1 | 10/2009 |
| JP | 2003104089 A | 4/2003 |

(Continued)

OTHER PUBLICATIONS

Extended European Search Report for corresponding Application No. 15855829.6-1710/3213950 PCT/JP2015080135; dated Oct. 13, 2017.

(Continued)

*Primary Examiner* — Binh Q Tran
(74) *Attorney, Agent, or Firm* — Norton Rose Fulbright US LLP

(57) ABSTRACT

A work vehicle accurately informs an operator of necessity of a regeneration operation and the manner thereof, and specific information on the regeneration operation. The work vehicle comprises a meter panel including: a regeneration operation indicator that indicates a state where the regeneration operation is necessary or a state where the regeneration operation is being performed, an alert indicator that indicates abnormality of the work vehicle, and a first display device that displays information on the regeneration operation. When the regeneration operation is necessary, the regeneration operation indicator, or the regeneration operation indicator and the alert indicator blink, and the first display device displays information on an operation neces- (Continued)

sary for performing the regeneration operation. When the regeneration operation is being performed, the regeneration operation indicator, or the regeneration operation indicator and the alert indicator light up, and the first display device displays information on a performing state of the regeneration operation.

18 Claims, 19 Drawing Sheets

(56) References Cited

U.S. PATENT DOCUMENTS

| | | | |
|---|---|---|---|
| 8,973,351 B2 | 3/2015 | Shibutani et al. | |
| 9,523,327 B2 * | 12/2016 | Shinomiya | F02D 41/029 |
| 9,810,131 B2 * | 11/2017 | Iwata | B60K 35/00 |
| 2003/0062827 A1 | 4/2003 | Nagai et al. | |
| 2005/0179532 A1 | 8/2005 | Nagai et al. | |
| 2010/0060442 A1 | 3/2010 | Hirano et al. | |
| 2013/0074481 A1 * | 3/2013 | Miura | F02D 41/029 60/311 |
| 2013/0133315 A1 * | 5/2013 | Shibutani | F01N 9/002 60/311 |
| 2013/0312616 A1 | 11/2013 | Shibamori et al. | |
| 2015/0246613 A1 * | 9/2015 | Shimazu | B60K 35/00 701/102 |

FOREIGN PATENT DOCUMENTS

| | | |
|---|---|---|
| JP | 2006233833 A | 9/2006 |
| JP | 2009257323 A | 11/2009 |
| JP | 2011106286 A | 6/2011 |
| JP | 2012225202 A | 11/2012 |
| JP | 2013030002 A | 2/2013 |
| JP | 2013113215 A | 6/2013 |
| JP | 2013181406 A | 9/2013 |
| JP | 2014029156 A | 2/2014 |
| WO | 2008062689 A1 | 5/2008 |

OTHER PUBLICATIONS

Notification of Reasons for Refusal for corresponding JP Application No. 2014-218761; dated Oct. 31, 2017.
Notification of Reasons for Refusal for corresponding JP Application No. 2014-218762; dated Oct. 31, 2017.
International Search Report corresponding to Application No. PCT/JP2015/080135; dated Dec. 28, 2015.
JP Notifications of Reasons for Refusal for corresponding JP 2014218760 dated Feb. 20, 2018.
JP Notifications of Reasons for Refusal for corresponding JP 2014218762 dated Feb. 20, 2018.

* cited by examiner

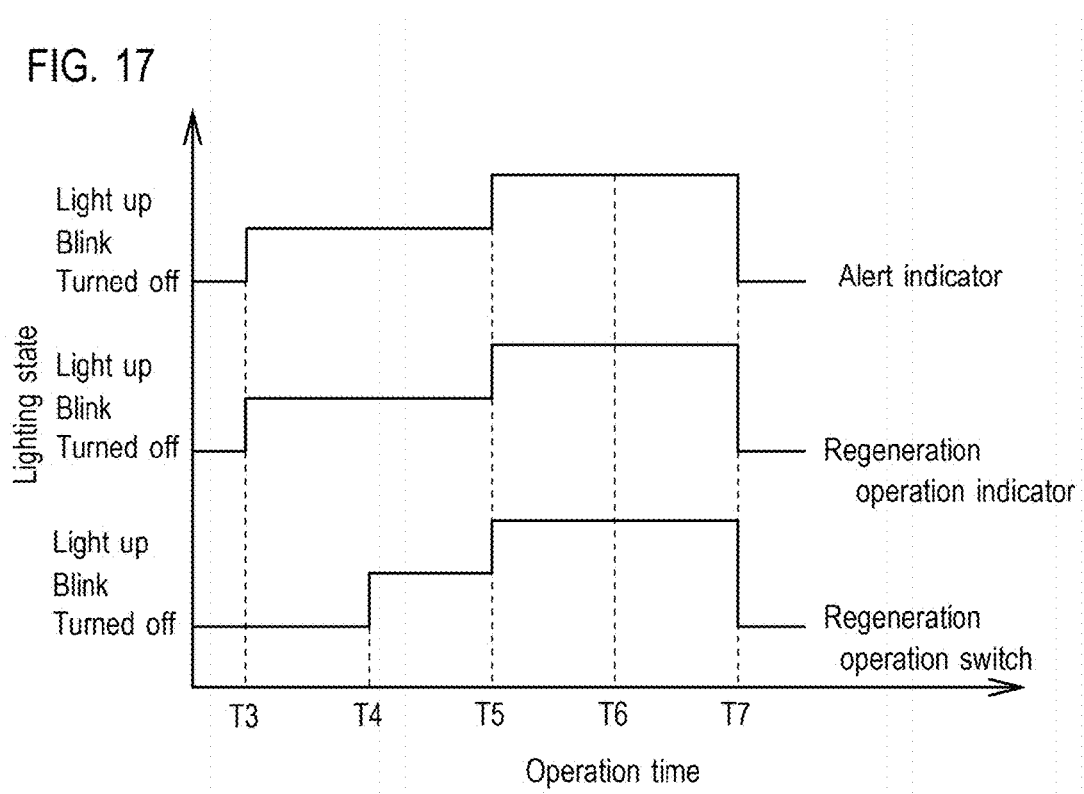

WORK VEHICLE

CROSS REFERENCE TO RELATED APPLICATIONS

This is the U.S. national stage of application No. PCT/JP2015/80135, filed on Oct. 26, 2015. Priority under 35 U.S.C. § 119(a) and 35 U.S.C. § 365(b) is claimed from Japanese Application No. 2014-218760, filed on Oct. 27, 2014, Japanese Application No. 2014-218761, filed on Oct. 27, 2014, and Japanese Application No. 2014-218762, filed on Oct. 27, 2014, the disclosures of which are also incorporated herein by reference.

TECHNICAL FIELD

The present invention relates to a work vehicle. Specifically, the present invention relates to a work vehicle that includes an exhaust gas purification apparatus.

BACKGROUND ART

Conventionally, there have been known work machines such as tractors that include an exhaust gas purification apparatus for collecting particulate matter (hereinafter simply referred to as "PM") contained in exhaust gas from a diesel engine or the like. In such a work vehicle, an increase in the PM accumulation amount remaining in the exhaust gas purification apparatus raises the exhaust back pressure, which invites poor fuel economy and reduced output of the engine. Accordingly, the work vehicle has the following function. When the estimated value of the PM accumulation amount remaining in the exhaust gas purification apparatus exceeds a prescribed amount, the exhaust air temperature is raised to be equal to or higher than the activation temperature of the oxidation catalyst, thereby forcibly oxidatively remove (regenerate) the PM collected by a soot filter. Such a technique is disclosed in, for example, Patent Document 1.

The work vehicle disclosed in Patent Document 1 indicates, when it becomes necessary to regenerate the exhaust gas purification apparatus, that a regeneration operation must be performed, by display means disposed at an operation manipulation unit. There are various methods of regeneration exhibiting their respective operations and effects. Accordingly, it is desirable to perform an optimum regeneration method according to the operation time of the work vehicle or the state of the exhaust gas purification apparatus. However, the work vehicle merely indicates the necessity of performing a regeneration operation, and does not provide the operator with any specific information relating to the regeneration operation.

PRIOR ART DOCUMENT

Patent Document

Patent Document 1: JP-A 2011-106286

SUMMARY OF THE INVENTION

Problems to be Solved by the Invention

The present invention has been made in view of the circumstances described above, and an object of present invention is to provide a work vehicle capable of accurately informing an operator of necessity of a regeneration operation and the manner thereof, and specific information on the regeneration operation.

Solutions to the Problems

There is provided a work vehicle including an exhaust gas purification apparatus for an engine, the exhaust gas purification apparatus performing a regeneration operation of oxidatively removing collected particulate matter in exhaust gas. The work vehicle comprises a meter panel including: a regeneration operation indicator that indicates a state where the regeneration operation is necessary or a state where the regeneration operation is being performed, an alert indicator that indicates abnormality of the work vehicle, and a first display device that displays information on the regeneration operation. When the regeneration operation is necessary, the regeneration operation indicator, or the regeneration operation indicator and the alert indicator blink, and the first display device displays information on an operation necessary for performing the regeneration operation. When the regeneration operation is being performed, the regeneration operation indicator, or the regeneration operation indicator and the alert indicator light up, and the first display device displays information on a performing state of the regeneration operation.

The work vehicle further comprises a second display device that is provided near an operator seat and that displays information on the regeneration operation. When the regeneration operation is necessary, the second display device displays information on an operation necessary for performing the regeneration operation and information on the regeneration operation which is not displayed on the first display device. When the regeneration operation is being performed, the second display device displays information on a performing state of the regeneration operation and information on the regeneration operation which is not displayed on the first display device.

If the regeneration operation can be performed only while the work vehicle stops, the regeneration operation indicator and the alert indicator blink or light up. If the regeneration operation can be performed while the work vehicle is in operation, only the regeneration operation indicator blinks or lights up.

The work vehicle further comprises a regeneration operation switch that is provided on a surface of a steering column which opposes to the operator seat and that at least partially lights up or blinks. When the regeneration operation is necessary and the regeneration operation can be performed, the regeneration operation switch blinks. When the regeneration operation is being performed, the regeneration operation switch lights up.

Effects of the Invention

The present invention exhibits the following effects.

That is, in the present invention, the regeneration operation indicator and the alert indicator indicate, by the manner of lighting, whether or not there exists the necessity of performing a regeneration operation, and the first display device displays specific information. Thus, the operator can be accurately informed of the necessity of performing a regeneration operation and the manner thereof, and specific information on the regeneration operation.

In the present invention, the second display device displays supplemental information. Thus, the operator can be quickly informed of the necessity of performing a regeneration operation, and provided with detailed information on the regeneration operation.

In the present invention, a combination of lighting of the regeneration operation indicator and that of the alert indicator indicates the condition of performing a regeneration operation. Thus, the operator can be accurately informed of the necessity of performing a regeneration operation and the manner thereof, and provided with specific information on the regeneration operation.

Further, in the present invention, lighting of the regeneration operation switch indicates whether or not regeneration is possible. Thus, the operator can be accurately informed of the necessity of performing a regeneration operation and the manner thereof, and provided with specific information on the regeneration operation.

BRIEF DESCRIPTION OF THE DRAWINGS

FIG. 17 is a graph showing the lighting manner of the indicators displayed on the meter panel and that of the regeneration operation switch in a stationary regeneration operation mode.

EMBODIMENTS OF THE INVENTION

The technical idea of the present invention is applicable to any work vehicle. In the present invention, a description will be given of a tractor as a representative work vehicle.

Figure 1:
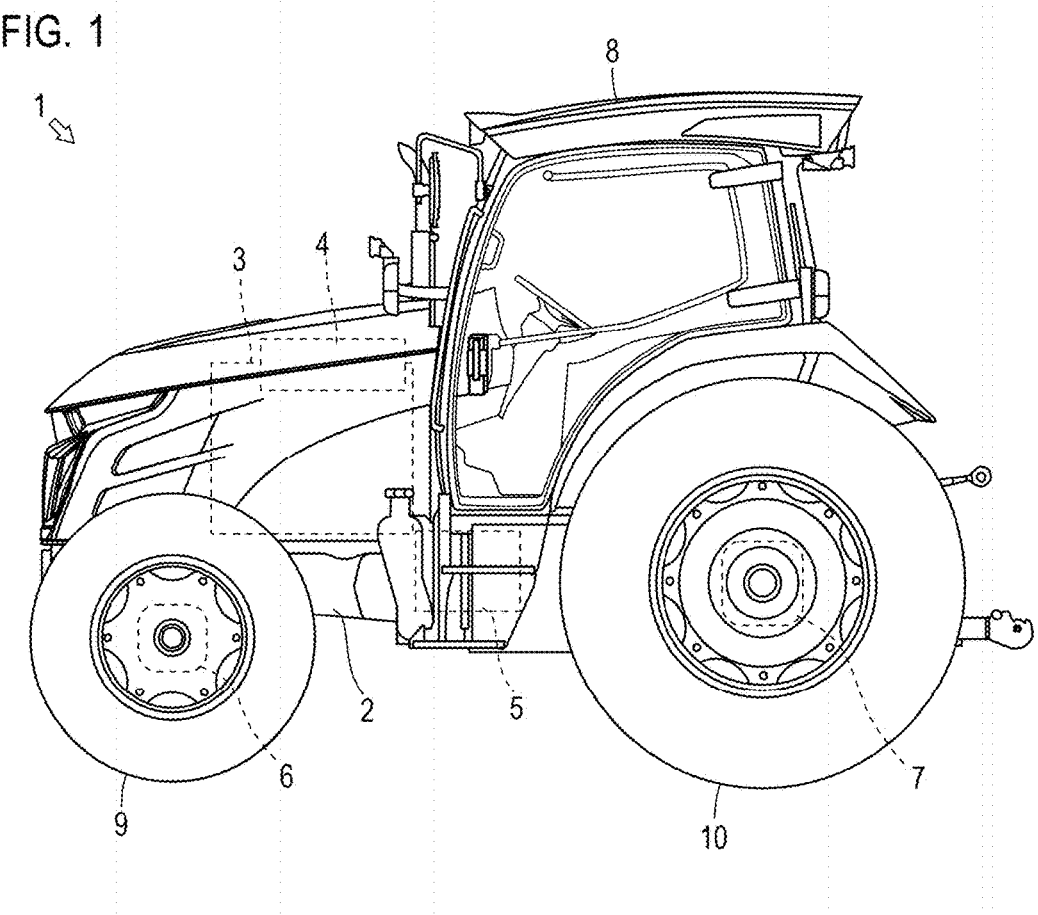
FIG. 1 is a diagram showing the structure of a tractor according to one embodiment.

Firstly, with reference to FIG. 1, a brief description will be given of a tractor 1. As shown in FIG. 1, the tractor 1 is mainly structured by a frame 2, an engine 3, a transmission 5, a front axle 6, and a rear axle 7. Further, the tractor 1 includes a cabin 8. The inside of the cabin 8 is an operator's compartment, in which an operator seat 19, operational components such as an acceleration pedal 22 and a gear shift lever 23, a second display device 28, a meter panel 30 and the like are disposed.

The frame 2 forms the framework on the front side of the tractor 1. The frame 2 structures, together with the transmission 5 and the rear axle 7, the chassis of the tractor 1. The engine 3 described in the following is supported by the frame 2. The engine 3 converts thermal energy obtained by combustion of fuel to kinetic energy. That is, the engine 3 generates rotary power by combustion of fuel. The operator's operating the acceleration pedal 22 (see FIG. 3) changes the operation state of the engine 3. Further, the engine 3 includes an exhaust gas purification apparatus 4. The exhaust gas purification apparatus 4 oxidizes particulates, carbon monoxide, hydrocarbon and the like contained in the exhaust gas.

The transmission 5 transmits the rotary power of the engine 3 to the front axle 6 and the rear axle 7. The transmission 5 receives the rotary power of the engine 3 through a coupling mechanism. Note that, the transmission 5 includes a continuously variable transmission, which is not shown. When the operator operates the gear shift lever 23 (see FIG. 3), the continuously variable transmission changes the operating state of the transmission 5 according to the operator's operation.

The front axle 6 transmits the rotary power of the engine 3 to front tires 9. The front axle 6 receives the rotary power of the engine 3 through the transmission 5. Note that, a steering apparatus (not shown) is juxtaposed to the front axle 6. When the operator operates a steering wheel 20 (see FIG. 3), the steering apparatus changes the steering angle of the front tires 9 according to the operator's operation. The rear axle 7 transmits the rotary power of the engine 3 to rear tires 10. The rear axle 7 receives the rotary power of the engine 3 through the transmission 5.

The tractor 1 includes a control apparatus 45 that controls the engine 3, the exhaust gas purification apparatus 4, the transmission 5, the various apparatuses and the like. The control apparatus 45 may be structured by a CPU, a ROM, a RAM, an HDD and the like being connected to one another via a bus, or may be structured by a one-chip LSI or the like. The control apparatus 45 stores various programs and data for controlling the engine 3, the exhaust gas purification apparatus 4, the transmission 5, the various apparatuses and the like. Further, in order for the tractor 1 to fully exhibit its performance, the tractor 1 is provided with a controller area network (CAN) which is an information network in which various apparatuses structuring the tractor 1 are connected in an organized manner about the control apparatus 45. In the tractor 1, the CAN allows the control apparatus 45 to closely monitor the state of the engine 3, the exhaust gas purification apparatus 4, the transmission 5, the various apparatuses and the like and display the state on the meter panel 30 and the like. Further, based on inputs from a not-shown control panel or the second display device 28, the control apparatus 45 integrally controls the engine 3, the exhaust gas purification apparatus 4, the transmission 5, and the various apparatuses and the like.

Figure 2:
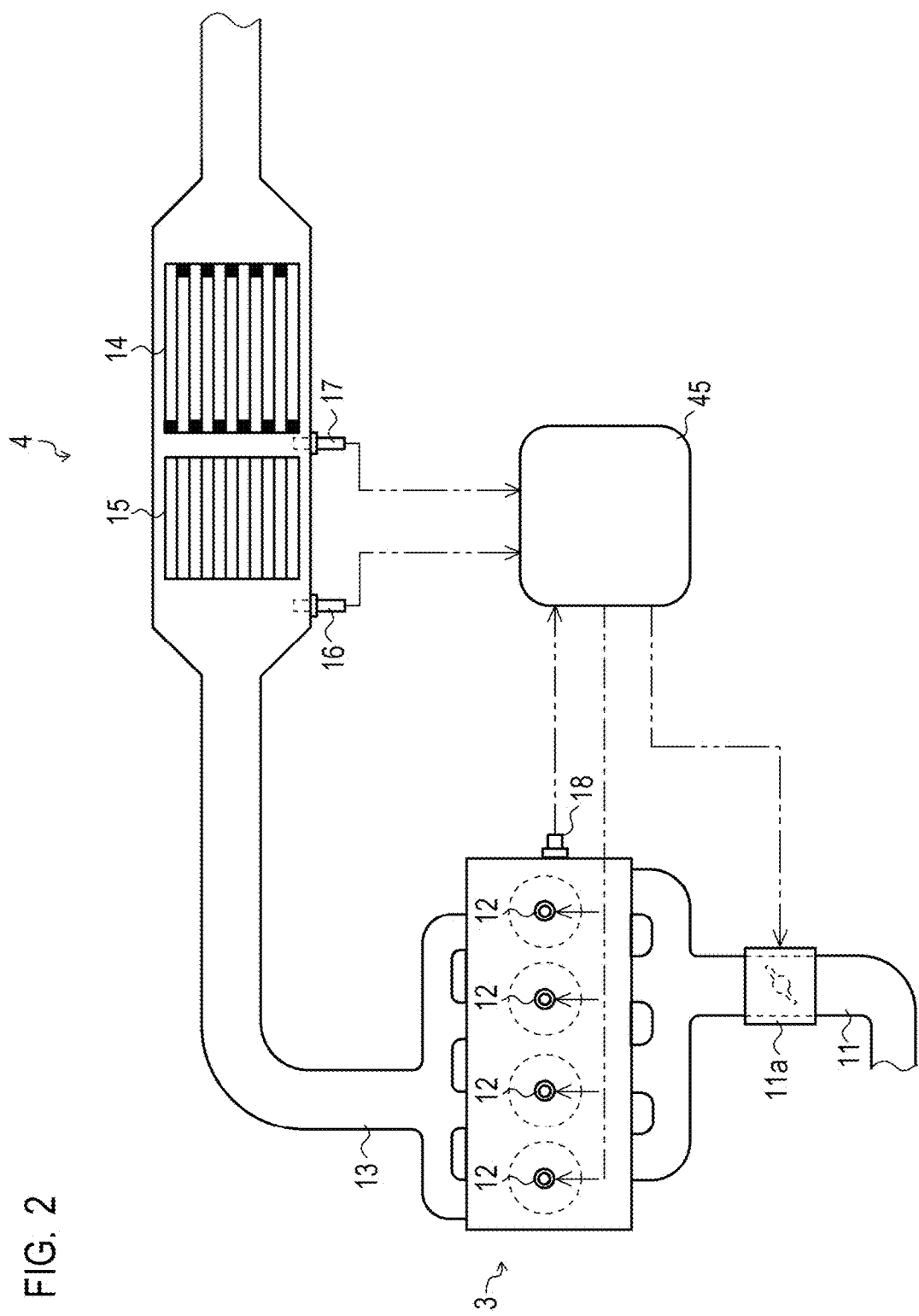
FIG. 2 is a schematic diagram showing the overall structure of an exhaust gas purification apparatus of the tractor.

Next, with reference to FIG. 2, a description will be given of the exhaust gas purification apparatus 4 of the tractor 1 according to one embodiment. Note that, as used herein, "upstream" refers to the upstream in the exhaust gas flow direction, and "downstream" refers to the downstream in the exhaust gas flow direction. As shown in FIG. 2, the exhaust gas purification apparatus 4 purifies the exhaust gas emitted from the engine 3. The exhaust gas purification apparatus 4 is installed in the engine 3, and includes a soot filter 14, an oxidation catalyst 15, a DPF upstream-side temperature sensor 16, a DPF downstream-side temperature sensor 17, a rotation speed sensor 18 and the like. The exhaust gas purification apparatus 4 is controlled by the control apparatus 45.

The engine 3 is a diesel engine. The engine 3 burns mixture of outside air supplied via an intake route 11 and fuel supplied via fuel injection valves 12 inside cylinders. Exhaust gas generated by the combustion of fuel is discharged via an exhaust route 13. To the intake route 11, an intake throttle 11a capable of controlling the intake air amount by adjusting the opening is provided. Note that, while the engine 3 according to the present embodiment is an in-line four-cylinder engine, the present invention is not limited thereto.

The soot filter 14 is disposed at the exhaust route 13 of the engine 3 to collect particulate matter (PM) in exhaust gas. The soot filter 14 has specifically a honeycomb structure formed by porous walls of ceramic or the like, and designed so that exhaust gas always passes through the porous walls before being discharged. The soot filter 14 collects PM in exhaust gas when the exhaust gas passes through the porous walls. As a result, PM is removed from the exhaust gas.

The oxidation catalyst 15 generates $NO_2$ by oxidation reaction to NO components in NOR, which are the components of exhaust gas. The oxidation catalyst 15 is provided upstream to the soot filter 14. The oxidation catalyst 15 oxidatively removes PM collected by the soot filter 14, by the oxidative function of the generated $NO_2$.

The DPF upstream-side temperature sensor 16 and the DPF downstream-side temperature sensor 17 detect exhaust air temperature t1. The DPF upstream-side temperature sensor 16 is provided upstream to the oxidation catalyst 15, and detects the upstream temperature of the oxidation catalyst 15, that is, the entry temperature of the oxidation catalyst 15 (the exhaust air temperature t1). The DPF downstream-side temperature sensor 17 is provided downstream to the oxidation catalyst 15, and detects the downstream temperature of the oxidation catalyst 15, that is, exit temperature t2 of the oxidation catalyst 15.

The rotation speed sensor 18 detects a rotation speed R of the engine 3. The rotation speed sensor 18 is provided to a not-shown crankshaft, flywheels or the like, and detects the rotation speed R of the engine 3 from the angle of the crankshaft.

The control apparatus 45 controls the engine 3 to perform a regeneration operation for oxidatively removing PM on the soot filter 14. The control apparatus 45 stores various programs and data for performing regeneration operations. The control apparatus 45 specifically stores data such as exhaust gas flow rate data obtained by calculation, internal temperature data of the oxidation catalyst 15 calculated based on the DPF upstream-side temperature sensor 16 and the DPF downstream-side temperature sensor 17, calculation result data of the PM oxidative removal amount, PM emission amount map M1, and oxidative removal efficiency map M2.

The control apparatus 45 is connected to the fuel injection valves 12 to control the fuel injection amount of the fuel injection valves 12, thereby controlling startup, stop, and output of the engine 3. The control apparatus 45 is connected to the rotation speed sensor 18, and acquires the rotation speed R of the engine 3 detected by the rotation speed sensor 18, and a fuel injection amount Fi injected by the fuel injection valves 12.

The control apparatus 45 is connected to the DPF upstream-side temperature sensor 16 and the DPF downstream-side temperature sensor 17, to acquire the entry temperature t1 of the oxidation catalyst 15 and the exit temperature t2 of the oxidation catalyst 15 respectively detected by the DPF upstream-side temperature sensor 16 and the DPF downstream-side temperature sensor 17.

The control apparatus 45 is capable of calculating an exhaust gas flow rate Ex per unit time, using the rotation speed R of the engine 3, the intake air amount, and the fuel injection amount Fi.

The control apparatus 45 is capable of calculating, every time the exhaust gas flow rate Ex is calculated, an internal temperature t3 of the oxidation catalyst 15 which is the average value of the internal temperature of the oxidation catalyst 15 using the entry temperature t1 of the oxidation catalyst 15, the exit temperature t2 of the oxidation catalyst 15, and the exhaust gas flow rate Ex. The control apparatus 45 is capable of calculating, every time the exhaust gas flow rate Ex is calculated, an emission amount PMout which is the PM emission amount per unit time based on the PM emission amount map M1 and using the rotation speed R of the engine 3 and the fuel injection amount Fi.

The control apparatus 45 is capable of calculating, every time the exhaust gas flow rate Ex is calculated, a removal amount PMreg which is the PM oxidative removal amount per unit time based on the PM oxidative removal efficiency map M2 and using the internal temperature t3 of the oxidation catalyst 15, and a calculated generation amount Ndo.

The control apparatus 45 is capable of calculating, every time the exhaust gas flow rate Ex is calculated, an accumulation amount PMdep which is a PM accumulation amount per unit time using the difference between the emission amount PMout and the removal amount PMreg, and is capable of accumulating the accumulation amount PMdep having been calculated. That is, the control apparatus 45 is capable of calculating a cumulative accumulation amount ΣPMdep which is obtained by cumulating the accumulation amount PMdep having been calculated every time the exhaust gas flow rate Ex is calculated.

The regeneration operation methods for oxidatively removing PM which has accumulated on the soot filter 14 include: self-regeneration in which PM is spontaneously regenerated at the soot filter 14 during normal operation of the engine 3; and forced regeneration in which the temperature of the exhaust gas is intentionally increased so that PM on the soot filter 14 is oxidatively removed. The forced regeneration includes assist regeneration, reset regeneration, stationary regeneration, and recovery regeneration. The stationary regeneration and the recovery regeneration are non-working mode regeneration.

In the self-regeneration, PM collected by the soot filter 14 is oxidatively removed by the oxidative function of $NO_2$ generated by the oxidation catalyst 15 oxidizing $NO_x$ contained in exhaust gas of the engine 3.

In the assist regeneration, the oxidation catalyst 15 is intentionally activated so that PM collected by the soot filter 14 is oxidatively removed. The control apparatus 45 increases the exhaust air temperature t1 to the activation temperature of the oxidation catalyst 15 by controlling the opening of the intake throttle 11a and the injection of the fuel injection valves 12. Thus, in the exhaust gas purification apparatus 4, $NO_2$ generated by the oxidation catalyst 15 oxidatively removes PM collected by the soot filter 14. Specifically, the control apparatus 45 reduces the intake air amount of the engine 3 by closing the intake throttle 11a by a predetermined degree. At the same time, the control apparatus 45 raises the exhaust air temperature by delaying the main injection of the fuel injection valves 12 and causing after-injection, which is injection of fuel performed after the main injection, so as to cause after burning. With these operations, the control apparatus 45 raises the exhaust air temperature t1 to activate the oxidation catalyst 15, so that PM collected by the soot filter 14 is oxidatively removed.

In the reset regeneration, in addition to the control manner of the assist regeneration, post injection is performed. The control apparatus 45 executes the reset regeneration when the cumulative operation time of the exhaust gas purification apparatus 4 becomes equal to or greater than a set time T0, or when a predetermined condition X is not satisfied despite the assist regeneration being performed (see FIG. 8). In addition to adjusting the opening of the intake throttle 11a, delaying the main injection of the fuel injection valves 12, and causing the after-injection, the control apparatus 45 causes post injection which is a further delayed injection, to supply unburned fuel to the soot filter 14. With these operations, the control apparatus 45 activates the oxidation catalyst 15 to further raise the exhaust air temperature t1, so that PM collected by the soot filter 14 is oxidatively removed.

In the stationary regeneration, in addition to the control manner of the reset regeneration, the rotation speed R of the engine 3 is maintained at a predetermined rotation speed. The control apparatus 45 executes the stationary regeneration when a predetermined condition Y is not satisfied despite the reset regeneration being performed, due to the operational status of the engine 3 or the like (see FIG. 9). In addition to adjusting the opening of the intake throttle 11a, causing the after-injection and the post injection with the fuel injection valves 12, the control apparatus 45 raises the rotation speed R of the engine 3 to a predetermined high rotation speed (e.g., 2200 rpm, a maximum rotation speed or a high idle rotation speed). With these operations, the control apparatus 45 further raises the exhaust air temperature t1 to activate the oxidation catalyst 15, so that PM collected by the soot filter 14 is oxidatively removed.

The recovery regeneration is performed in the case where PM has excessively accumulated on the DPF under any conditions. While the recovery regeneration is performed in a control manner substantially identical to that of the stationary regeneration, the exhaust air temperature t1 is controlled to be lower than in the non-working mode regeneration. This is to prevent PM which has excessively accumulated on the DPF from being suddenly regenerated (burned) when the regeneration begins, and to avoid an excessive increase in the temperature of the DPF. The control apparatus 45 controls the after-injection amount and the post injection amount of the fuel injection valves 12, so that the exhaust air temperature t1 is lower than in the stationary regeneration. With these operations, the control apparatus 45 oxidatively removes PM collected by the soot filter 14 for a long period (e.g., 3 to 3.5 hours).

Next, with reference to FIGS. 3, 4A and 4B, a description will be given of the operator's compartment of the tractor 1.

Figure 3:
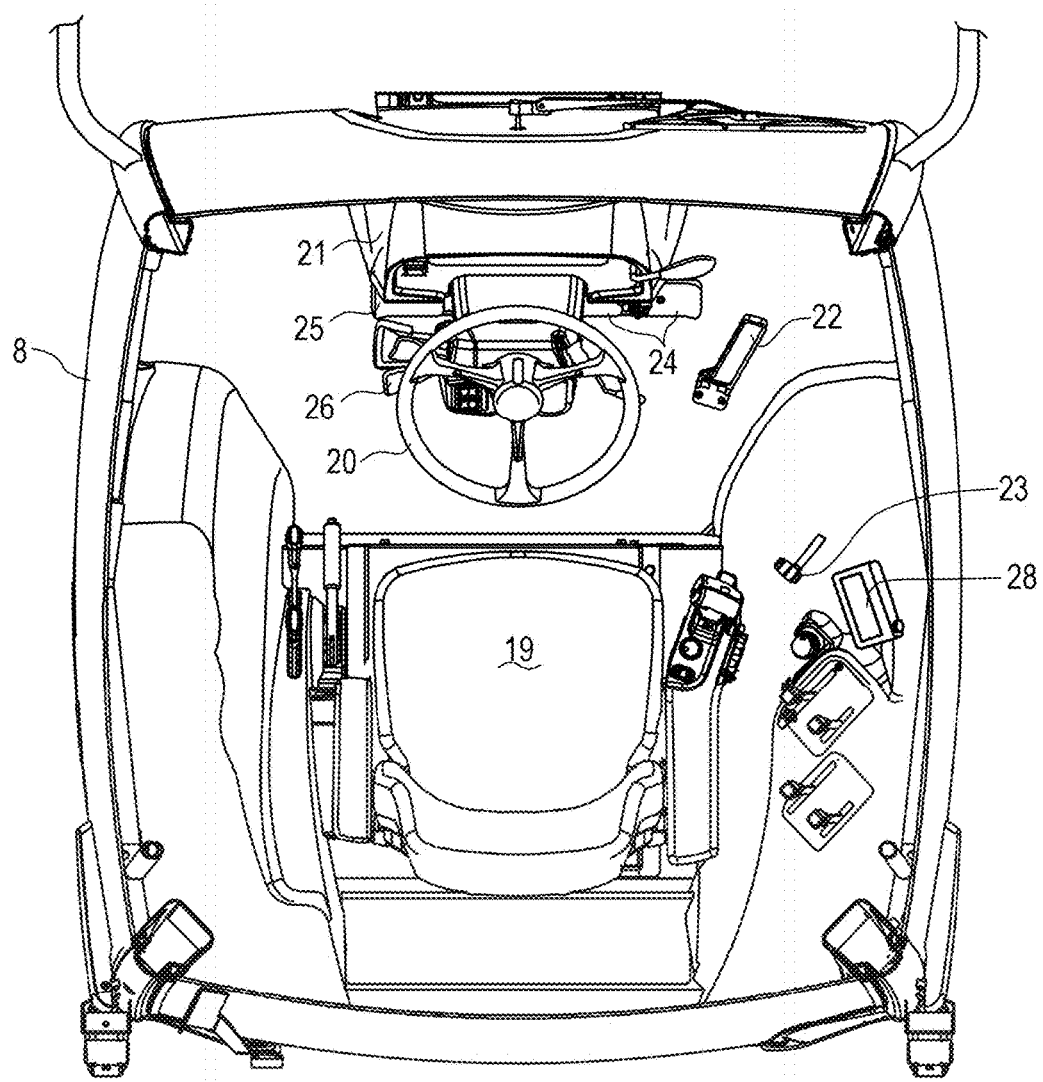
FIG. 3 is a diagram showing an operator seat and its surrounding of the tractor.
Figure 4A:
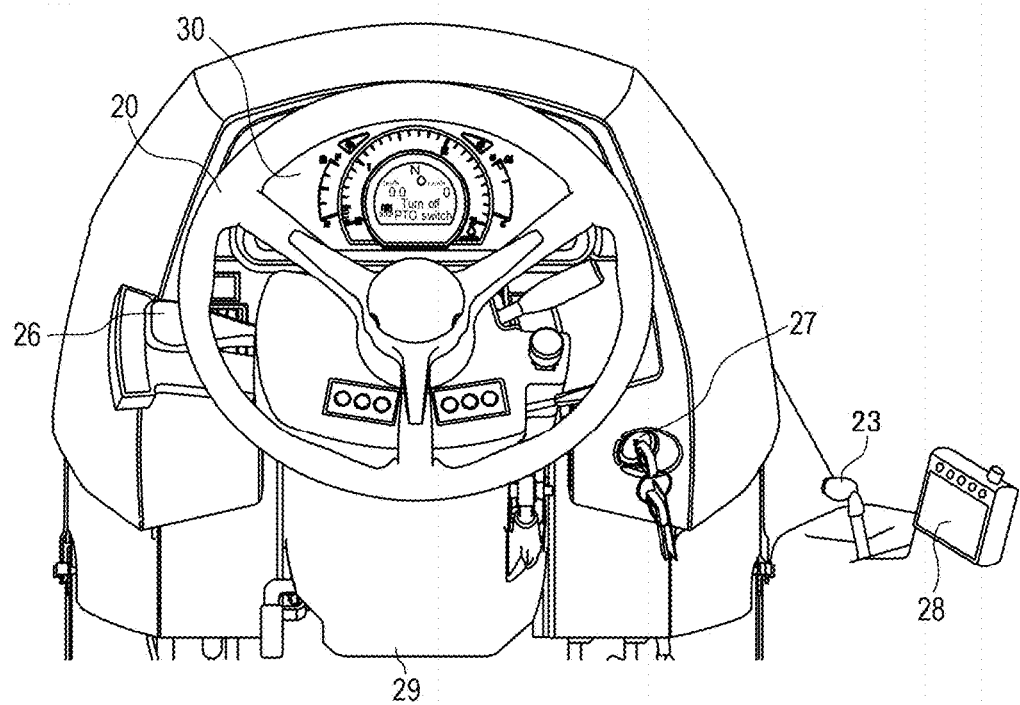
FIG. 4A is a diagram showing an instrument panel of the tractor.
Figure 4B:
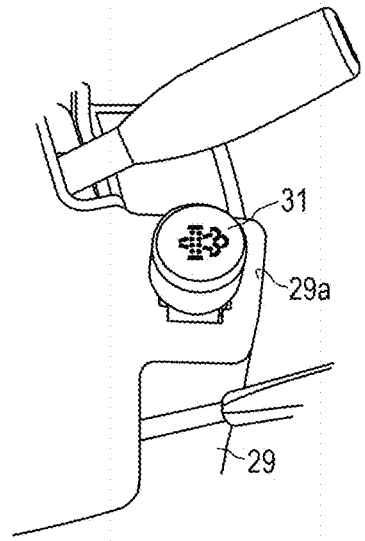
FIG. 4B is a diagram showing a regeneration operation switch of the tractor.

As shown in FIG. 3, the inside of the cabin 8 forms the operator's compartment. The operator seat 19 is disposed substantially at the center of the cabin 8. Around the operator seat 19, the steering wheel 20, the instrument panel 21, the acceleration pedal 22, the gear shift lever 23, a brake pedal 24, a clutch pedal 25, a reverser lever 26, a key switch 27 (see FIGS. 4A and 4B) and the second display device 28 are disposed.

The cabin 8 (the operator's compartment) is configured to allow the operator seated on the operator seat 19 to drive the tractor 1 using the steering wheel 20, the acceleration pedal 22, the gear shift lever 23, the steering wheel 20, the brake pedal 24, the clutch pedal 25, the reverser lever 26 and the like. The instrument panel 21 is disposed in front of the operator seat 19. On the instrument panel 21, the meter panel 30 that includes a first display device 42 being one display device is disposed. The steering column 29 is disposed on the operator seat 19 side relative to the instrument panel 21, to support the steering wheel 20. Further, the second display device 28 being other display device is disposed on the right front side of the operator seat 19, having its display screen opposed to the operator seat 19.

As shown in FIG. 3, the meter panel 30 is disposed on the instrument panel 21. The meter panel 30 is disposed as being opposed to the operator seat 19, so that the operator seated on the operator seat 19 can visually recognize the meter panel 30. A regeneration operation switch 31 is disposed on an upper surface 29a of the steering column 29 as being opposed to the operator seat. The regeneration operation switch 31 is disposed at the position where the operator seated on the operator seat 19 can visually recognize and operate the regeneration operation switch 31. That is, the regeneration operation switch 31 is disposed at the position where the operator seated on the operator seat 19 can visually recognize both the regeneration operation switch 31 and indication on the meter panel 30.

The regeneration operation switch 31 is for performing regeneration operations which will be described later. The regeneration operation switch 31 is formed by a push button in the present embodiment. The regeneration operation switch 31 is connected to the control apparatus 45. The push surface of the regeneration operation switch 31 can blink or light up. The regeneration operation switch 31 displays a symbol relating to the regeneration operation on the push surface by the push surface blinking or lighting up.

Next, with reference to FIGS. 5, 6 and 9, a description will be given of the meter panel 30. The meter panel 30 indicates any of information including the operation information of the tractor 1 and the abnormality information of the constituents of the tractor 1.

Figure 5:
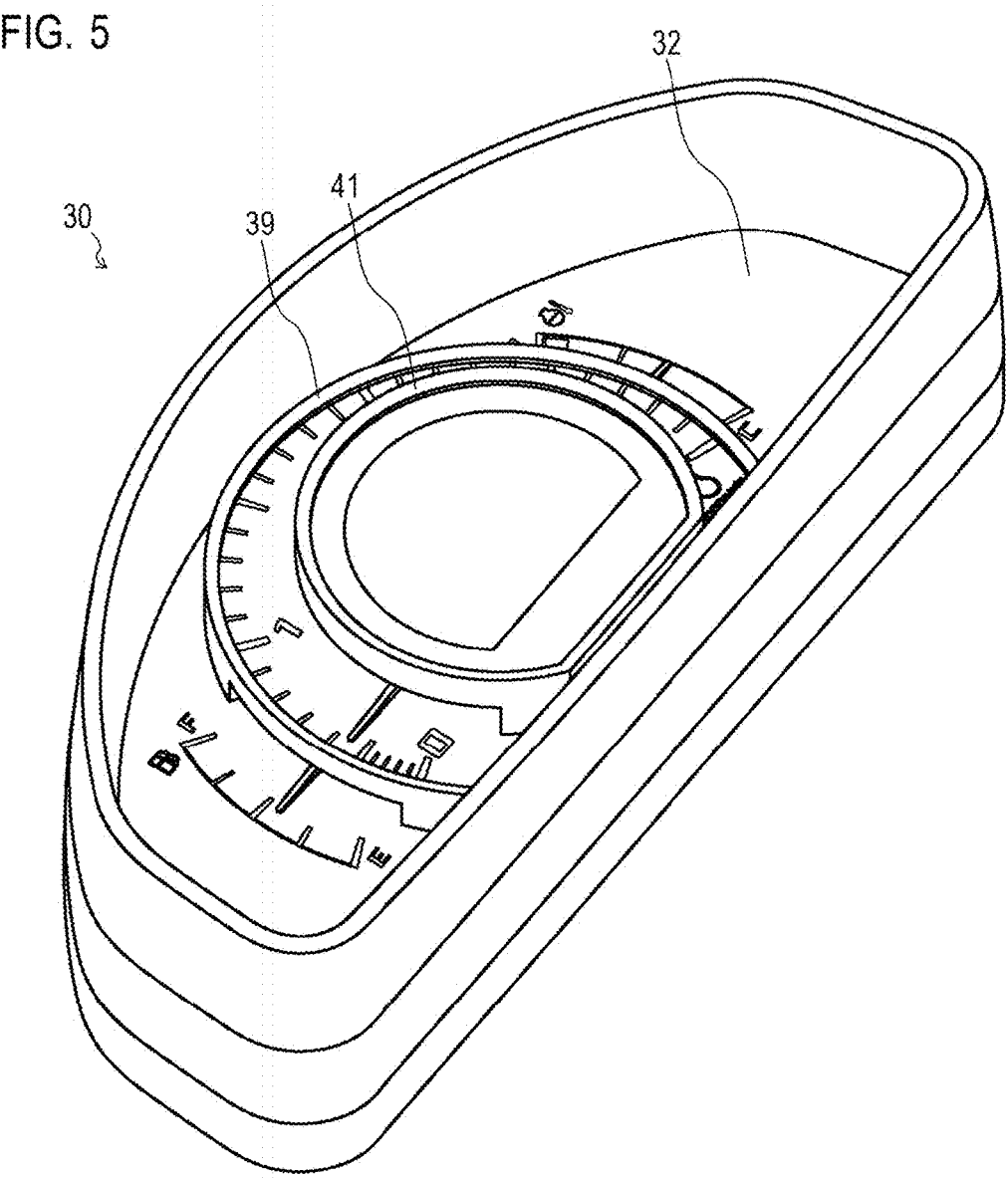
FIG. 5 is a perspective view showing the shape of a meter panel of the tractor.

As shown in FIG. 5, the meter panel 30 is structured by a first display part 32, a second display part 39, and a third display part 41. The semicircular second display part 39 is overlaid on the first display part 32 at its center. The semicircular third display part 41 is overlaid on the second display part 39 at its center. That is, the meter panel 30 is structured by the first display part 32, the second display part 39, and the third display part 41 layered in this order.

Figure 6:
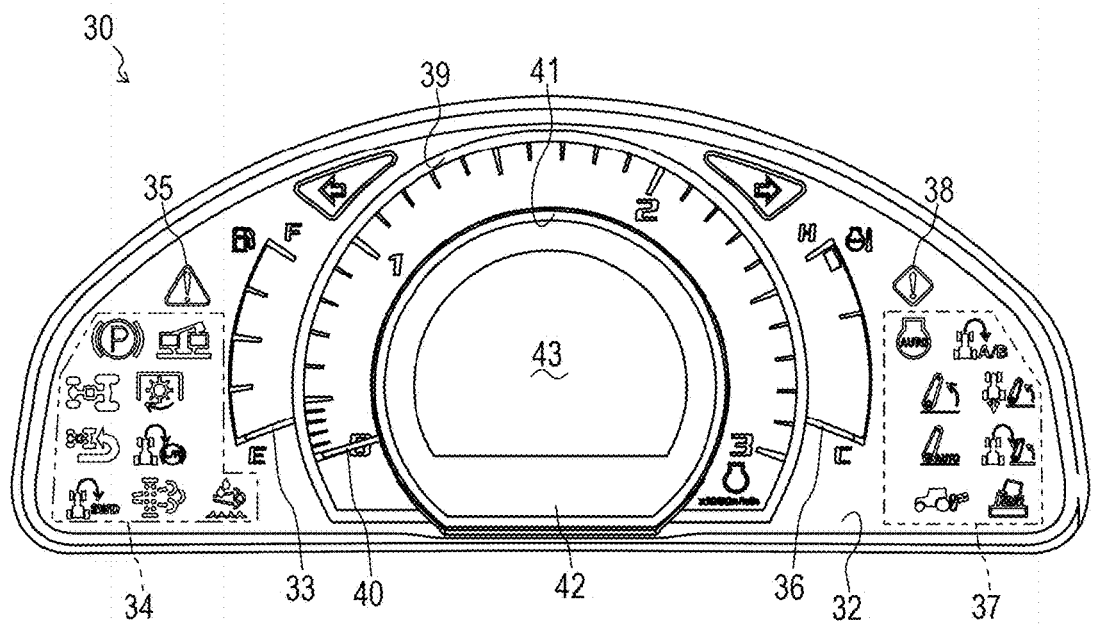
FIG. 6 is a diagram showing the display structure of the meter panel of the tractor.

As shown in FIG. 6, in the meter panel 30, a fuel gauge 33, a water temperature gauge 36, tractor-related indicators 34, work machine-related indicators 37, a rotation speed meter 40 of the engine 3, the first display device 42 and the like are provided. In the first display part 32 of the meter panel 30, the needle-type fuel gauge 33, the needle-type water temperature gauge 36, the tractor-related indicators 34, and the work machine-related indicators 37 are provided.

On the left side of the first display part 32 of the meter panel 30, the fuel gauge 33 is disposed. The fuel gauge 33 is rotatably supported around the center of the first display part 32. On the left side of the fuel gauge 33, the tractor-related indicators 34 indicative of information relating to the tractor 1 and an alert indicator 35 are disposed. Further, on the right side of the first display part 32, the water temperature gauge 36 is disposed. The water temperature gauge 36 is rotatably supported around the center of the first display part 32. On the right side of the water temperature gauge 36, the work machine-related indicators 37 indicative of information relating to the work machine and a caution indicator 38 are disposed. The rotatably supported portion of the fuel gauge 33 and that of the water temperature gauge 36 are covered with the second display part 39. That is, the first display part 32 is configured to allow the needle of the fuel gauge 33 and the needle of the water temperature gauge 36 to move along the outer edge of the second display part 39.

The tractor-related indicators 34 include a regeneration operation indicator 34A. The regeneration operation indicator 34A is indicated when the necessity of performing a regeneration operation arises or when a regeneration operation is being performed. The regeneration operation indicator 34A is configured so that a symbol of the soot filter 14 lights up.

The alert indicator 35 is indicated upon occurrence of an abnormal state of the tractor 1 which must be quickly addressed. The alert indicator 35 is configured so that the symbol of "!" surrounded by a triangular frame lights up in red color. The caution indicator 38 lights up when it is necessary to attract the attention of the operator as to the state of the tractor 1. The caution indicator 38 is configured so that the symbol of "!" surrounded by a rhombic frame lights up in yellow color.

In the second display part 39 of the meter panel 30, the needle-type rotation speed meter 40 is provided. The rotation speed meter 40 is rotatably supported around the center of the second display part 39. Further, the rotation speed meter 40 is configured to point the scale along the arc portion of the second display part 39. The rotatably supported portion of the rotation speed meter 40 is covered with the third display part 41. That is, the second display part 39 is configured so that the needle of the rotation speed meter 40 points the scale along the arc portion of the second display part 39 while moving along the outer edge of the third display part 41.

In the third display part 41 of the meter panel 30, the first display device 42 is provided. The first display device 42 is disposed to be surrounded by the rotation speed meter 40 of the engine 3. The first display device 42 is disposed so that a first display screen 43 structured by a liquid crystal screen and the like opposes to the operator seat. The first display screen 43 indicates the vehicle speed of the tractor 1, the rotation speed of the engine 3, various set values, various types of detailed information, abnormality information and the like. The first display device 42 is configured so that contents indicated on the first display screen 43 are shown separately at the screen upper level, the screen middle level, and the screen lower level.

Figure 9:
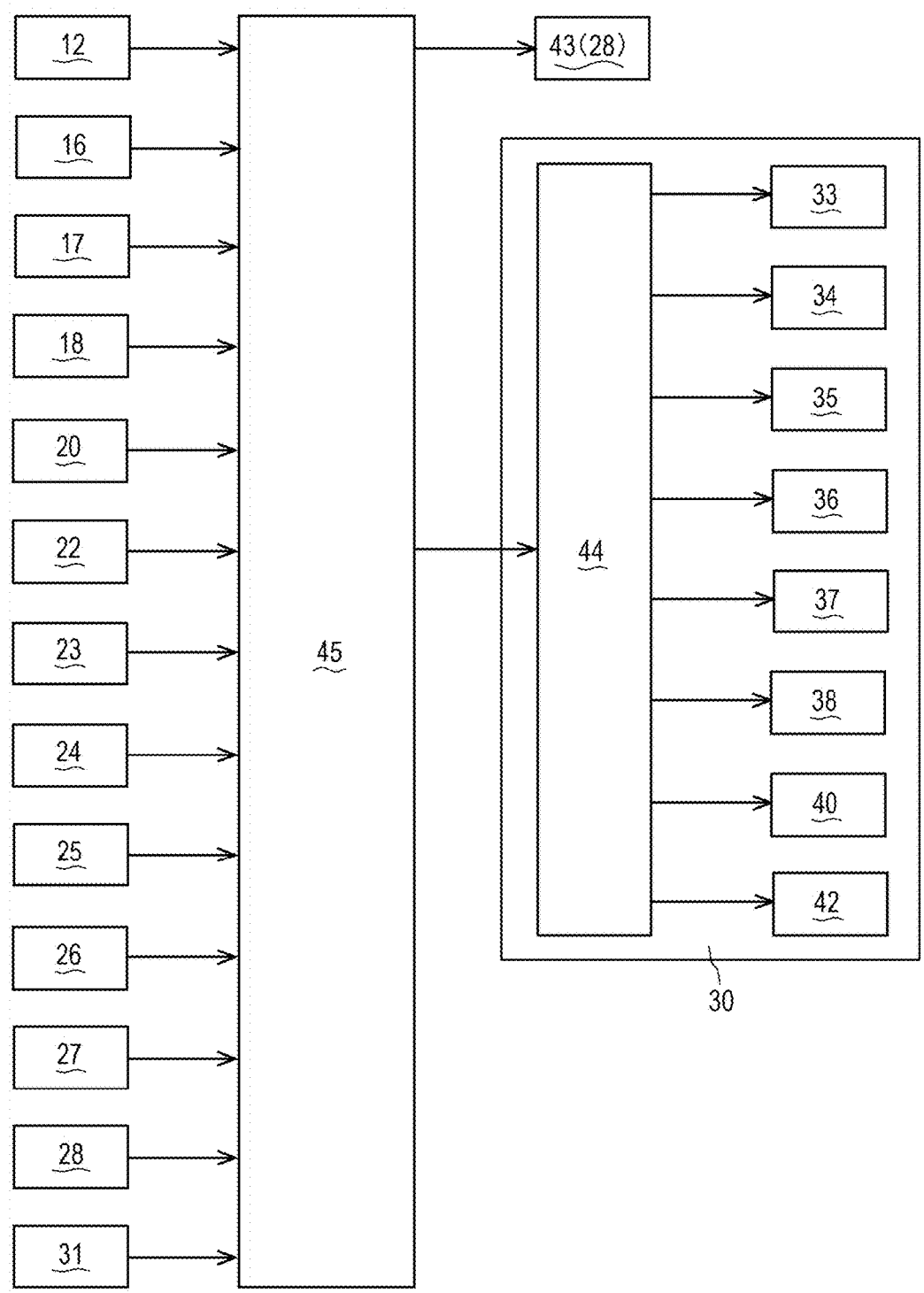
FIG. 9 is a schematic diagram showing the control structure of the tractor.

As shown in FIG. 9, the meter panel 30 is provided with the meter panel control apparatus 44 that controls the fuel gauge 33, the tractor-related indicators 34, the alert indicator 35, the water temperature gauge 36, the work machine-related indicators 37, the caution indicator 38, the rotation speed meter 40, and the first display device 42 and the like. The meter panel control apparatus 44 is provided at the position that cannot be externally visually recognized. The meter panel control apparatus 44 is connected to the fuel gauge 33, the tractor-related indicators 34, the alert indicator 35, the water temperature gauge 36, the work machine-related indicators 37, the caution indicator 38, the rotation speed meter 40, and the first display device 42, and capable of controlling the fuel gauge 33, the tractor-related indicators 34, the alert indicator 35, the water temperature gauge 36, the work machine-related indicators 37, the caution indicator 38, the rotation speed meter 40, and the first display device 42.

Next, with reference to FIGS. 7 to 9, a description will be given of the second display device 28. The second display device 28 displays any of the setting of various values of the tractor 1, the operation information of the tractor 1, and the abnormality information of the constituents.

Figure 7:
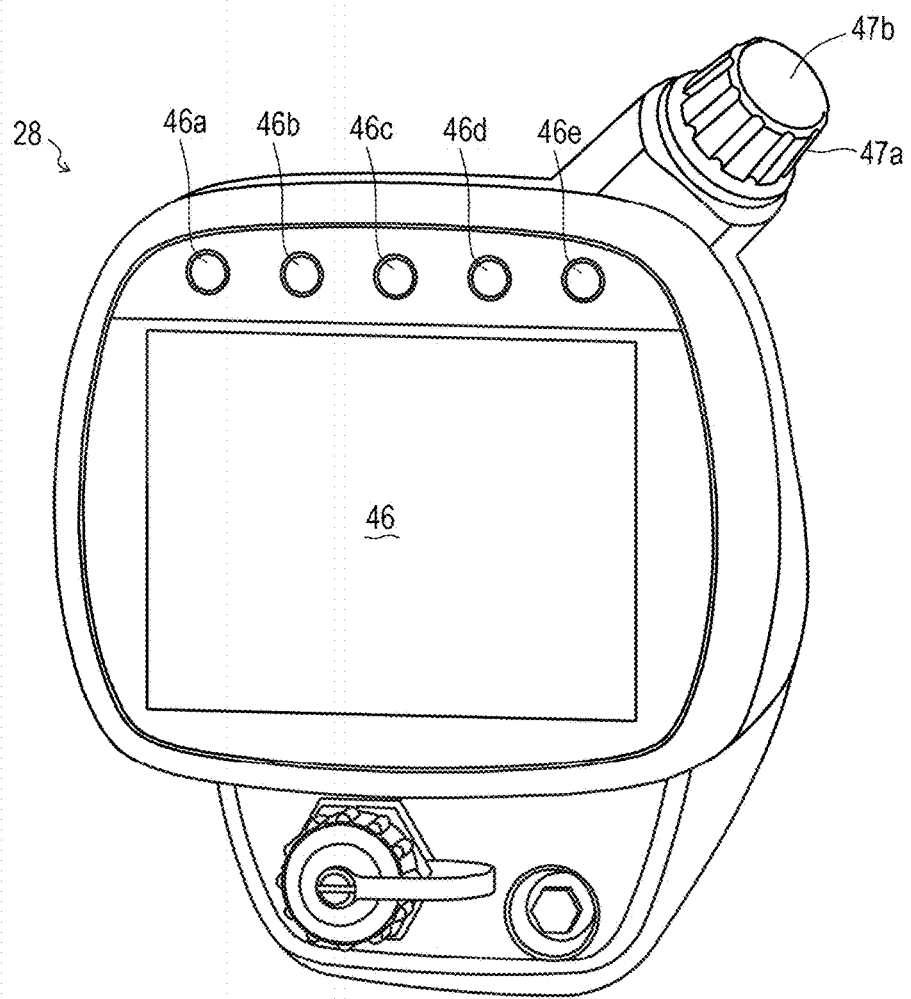
FIG. 7 is a schematic diagram showing a second display device of the tractor.

As shown in FIG. 7, the second display device 28 has a second display screen 46 structured by a liquid crystal screen and the like, an encoder dial 47a which is a screen selector apparatus, and an enter button 47b for determining the selected operation. Further, the second display device 28 has five command buttons 46a, 46b, 46c, 46d, 46e which are input means. The second display device 28 is disposed on the side console which is the right front side relative to the operator seat 19, so as to allow the operator to operate the second display device 28 with the right hand (see FIGS. 3, 4A and 4B).

The second display screen 46 is provided at the center on the front surface of the second display device 28. The second display screen 46 is configured to display the predetermined screen based on the instructions from the control apparatus 45, which will be described later. For example, the second display screen 46 displays a home screen S1 (see FIG. 8) based on an instruction from the control apparatus 45. The second display screen 46 may be a so-called touch panel.

The encoder dial 47a is provided on the right side of the upper surface of the second display device 28. In selecting the elements displayed on the second display screen 46, the encoder dial 47a allows the operator to switch the selected element by scrolling tabs or traversing the highlighted area. For example, the encoder dial 47a allows the operator to scroll tabs thereby switching the displayed numerics or alphabet letters. Further, in selecting the displayed icons, the encoder dial 47a allows the operator to switch the selected element by traversing the highlighted icons.

The enter button 47b is provided integrally with the encoder dial 47a. The enter button 47b transmits, to the control apparatus 45, information of one element selected with the encoder dial 47a or the like out of the elements displayed on the second display screen 46. For example, the enter button 47b transmits, to the control apparatus 45, information of one numeric or alphabet letter selected with the encoder dial 47a or the like out of the displayed numerics or alphabet letters. Further, the enter button 47b transmits, to the control apparatus 45, information of one icon selected with the encoder dial 47a out of the displayed icons. Note that, in the second display device 28, while the enter button 47b is structured so that the encoder dial 47a itself is pushed in, a push button may be provided on the upper end surface of the encoder dial 47a.

The command buttons 46a, 46b, 46c, 46d, 46e are provided on the upper part of the front surface of the second display device 28. The command buttons 46a, 46b, 46c, 46d, 46e are provided in order to transmit, to the control apparatus 45, a signal indicating that a predetermined screen displayed on the second display screen 46 is switched to other screen, or information of one selected element on the screen. For example, in the case where the home screen S1 is displayed on the second display screen 46, the command buttons 46a, 46b transmit, to control apparatus 45, a signal indicating that the home screen S1 is switched to a shortcut screen (a screen arbitrarily set by the operator).

The home screen S1 displays icons Ia1, Ia2, Ia3, Ia4, Ia8 in upper and lower two rows for selecting a menu. The selected one of the icons Ia1, Ia2, Ia3, Ia4, Ia8 is highlighted (e.g., see the icon Ia8). Then, the highlighted icon is traversed in accordance with the rotation of the encoder dial 47a. By rotating the encoder dial 47a, the operator can select one of the icons Ia1, Ia2, Ia3, Ia4, Ia8, and determine the selected icon by pressing the enter button 47b.

Further, in the home screen S1, the operator can select one of the icons Ia1, Ia2, Ia3, Ia4, Ia8 by pressing one of the command buttons 46a, 46b, 46c, 46d, 46e. Further, the home screen S1 can be switched to other screen with the command button 46d. In the present embodiment, the home screen S1 shows the state where the icon Ia1 reading "Tractor information" is selected. Further, the home screen S1 shows the state where the icon Ia8 reading "Camera 2" is grayed out and thus cannot be selected.

As shown in FIG. 9, the control apparatus 45 is electrically connected to operational components and apparatuses such as the fuel injection valves 12, the DPF upstream-side temperature sensor 16, the DPF downstream-side temperature sensor 17, the rotation speed sensor 18, the steering wheel 20, the acceleration pedal 22, the gear shift lever 23, the brake pedal 24, the clutch pedal 25, the reverser lever 26, the key switch 27, the second display device 28, the regeneration operation switch 31 and the like, so as to be capable of acquiring signals from the operational component and the apparatuses. Further, the control apparatus 45 is connected to the meter panel control apparatus 44, so as to be capable of transmitting, to the meter panel control apparatus 44, signals indicative of any of information including information on the operations of the work vehicle such as the rotation speed of the engine 3, the amount of remaining fuel, the water temperature, and any regeneration operation, and abnormality information of the constituents of the work vehicle.

In the following, with reference to FIGS. 10 and 11, a specific description will be given of the control manner of regeneration operations with the tractor 1. A forced regeneration process refers to a regeneration operation whose manner of regeneration is the assist regeneration, the reset regeneration, the stationary regeneration, and the recovery regeneration. That is, a regeneration operation whose manner of regeneration is the self-regeneration is not included in the forced regeneration process. Note that, in the present embodiment, the description will be given on the premise that the control apparatus 45 has acquired a regeneration operation signal by the operator's operating the regeneration operation switch 31.

Upon acquisition of the regeneration operation signal by the operator's operating the regeneration operation switch 31, the control apparatus 45 starts a forced regeneration process A, and proceeds to step S110.

Figure 10:
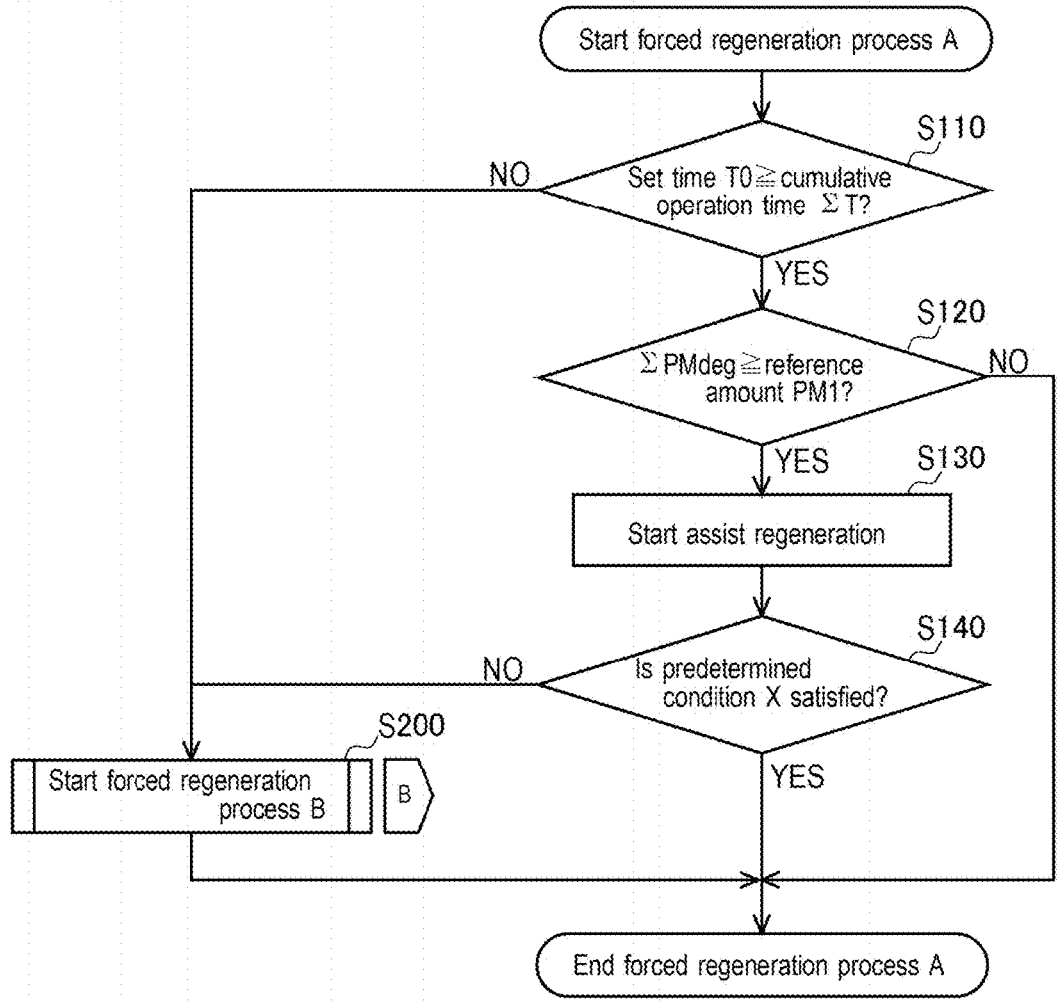
FIG. 10 is a flowchart showing the control manner of assist regeneration in the exhaust gas purification apparatus of the tractor.

As shown in FIG. 10, in step S110, the control apparatus 45 determines whether or not a cumulative operation time $\Sigma T$ of the engine 3 since the last forced regeneration is equal to or smaller than a set time T0 (e.g., 100 h). As a result, when it is determined that the cumulative operation time $\Sigma T$ of the engine 3 since the last forced regeneration is equal to or smaller than the set time T0, the control apparatus 45 proceeds to step S120. On the other hand, when it is determined that the cumulative operation time $\Sigma T$ of the engine 3 since the last forced regeneration is not equal to or smaller than the set time T0, the control apparatus 45 proceeds to step S200.

In step S120, the control apparatus 45 determines whether a cumulative accumulation amount $\Sigma PMdep$ is equal to or greater than a reference amount PM1. As a result, when it is determined that the cumulative accumulation amount $\Sigma PMdep$ is equal to or greater than the reference amount PM1 (e.g., 8 g/l), the control apparatus 45 proceeds to step S130. On the other hand, when it is determined that the cumulative accumulation amount $\Sigma PMdep$ is not equal to or greater than the reference amount PM1, the control apparatus 45 ends the forced regeneration process A and proceeds to step S110.

In step S130, the control apparatus 45 starts a regeneration operation whose manner of regeneration is the assist regeneration, and proceeds to step S140.

In step S140, the control apparatus 45 determines whether or not the predetermined condition X is satisfied. As a result, when it is determined that the predetermined condition X is satisfied, for example, when the cumulative accumulation amount $\Sigma PMdep$ has reduced to become less than a reference amount PM2 (e.g., 7 g/l) after a lapse of a predetermined time Ta (e.g., 10 min) since the start of the assist regeneration, and further a predetermined time Tb (e.g., 30 min) has elapsed, or when the cumulative accumulation amount $\Sigma PMdep$ has reduced to become less than a predetermined amount MP3 (e.g., 6 g/l), the control apparatus 45 ends the forced regeneration process A and proceeds to step S110. On the other hand, when it is determined that the predetermined condition X is not satisfied, for example, when the cumulative accumulation amount $\Sigma PMdep$ is equal to or greater than the reference amount PM2 after a lapse of the predetermined time Ta since the start of the assist regeneration, the control apparatus 45 proceeds to step S200.

Figure 11:
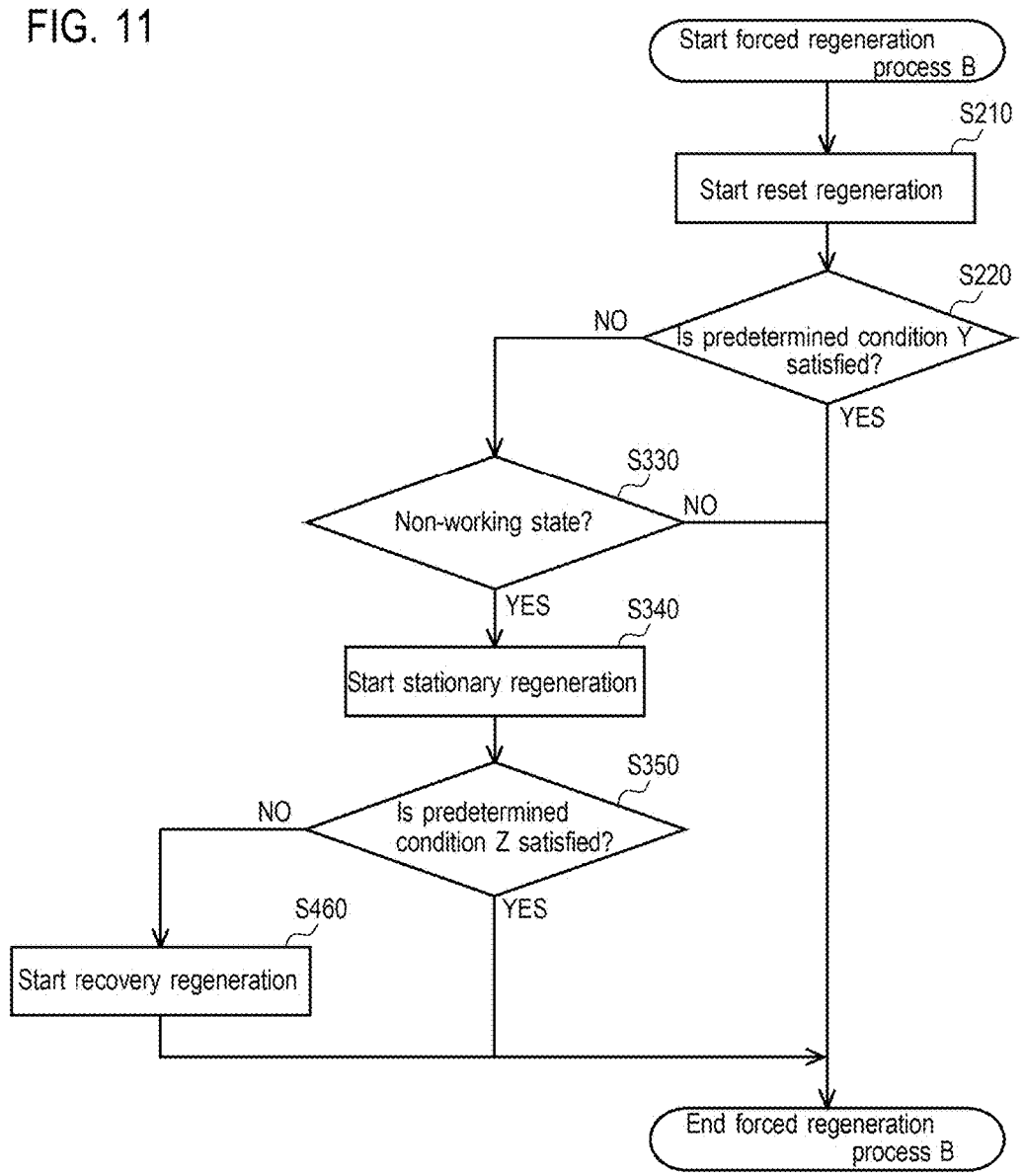
FIG. 11 is a flowchart showing a control manner of reset regeneration, non-working mode regeneration, and recovery regeneration in the exhaust gas purification apparatus of the tractor.

In step S200, the control apparatus 45 starts a forced regeneration process B, and proceeds to step S210 (see FIG. 11).

As shown in FIG. 11, in step S210, the control apparatus 45 starts a regeneration operation whose manner of regeneration is the reset regeneration, and proceeds to step S220.

In step S220, the control apparatus 45 determines whether or not the predetermined condition Y is satisfied. As a result, when it is determined that the predetermined condition Y is satisfied, for example when the cumulative accumulation amount ΣPMdep has reduced to become less than the reference amount PM2 (e.g., 7 g/l) after a lapse of the predetermined time Ta (e.g., 10 min) since the start of the reset regeneration, and further the predetermined time Tb (e.g., 30 min) has elapsed, or when the cumulative accumulation amount ΣPMdep has reduced to become less than the predetermined amount MP3 (e.g., 6 g/l), the control apparatus 45 ends the forced regeneration process B and proceeds to step S110 (see FIG. 8).

On the other hand, when it is determined that the predetermined condition Y is not satisfied, for example when the cumulative accumulation amount ΣPMdep is equal to or greater than the reference amount PM2 after a lapse of the predetermined time Ta since the start of the reset regeneration, the control apparatus 45 proceeds to step S330.

In step S330, the control apparatus 45 determines whether or not the work machine and the like in which the engine 3 is installed is in a non-working state. As a result, when it is determined that the work machine and the like in which the engine 3 is installed in the non-working state, the control apparatus 45 proceeds to step S340. On the other hand, when it is determined that the work machine and the like in which the engine 3 is installed is not in the non-working state, the control apparatus 45 ends the forced regeneration process B and proceeds to step S110 (see FIG. 8).

In step S340, the control apparatus 45 starts a regeneration operation whose manner of regeneration is the stationary regeneration, and proceeds to step S350.

In step S350, the control apparatus 45 determines whether or not a predetermined condition Z is satisfied. As a result, when it is determined that the predetermined condition Z is satisfied, for example when the cumulative accumulation amount ΣPMdep has reduced to become less than the reference amount PM2 (e.g., 7 g/l) after a lapse of the predetermined time Ta (e.g., 10 min) since the start of the assist regeneration, and further the predetermined time Tb (e.g., 30 min) has elapsed, or when the cumulative accumulation amount ΣPMdep has reduced to become less than the predetermined amount MP3 (e.g., 6 g/l), the control apparatus 45 ends the forced regeneration process B and proceeds to step S110 (see FIG. 8). On the other hand, when it is determined that the predetermined condition Y is not satisfied, for example, when the cumulative accumulation amount ΣPMdep is equal to or greater than the reference amount PM2 after a lapse of the predetermined time Ta since the start of the stationary regeneration, the control apparatus 45 proceeds to step S460.

Figure 8:
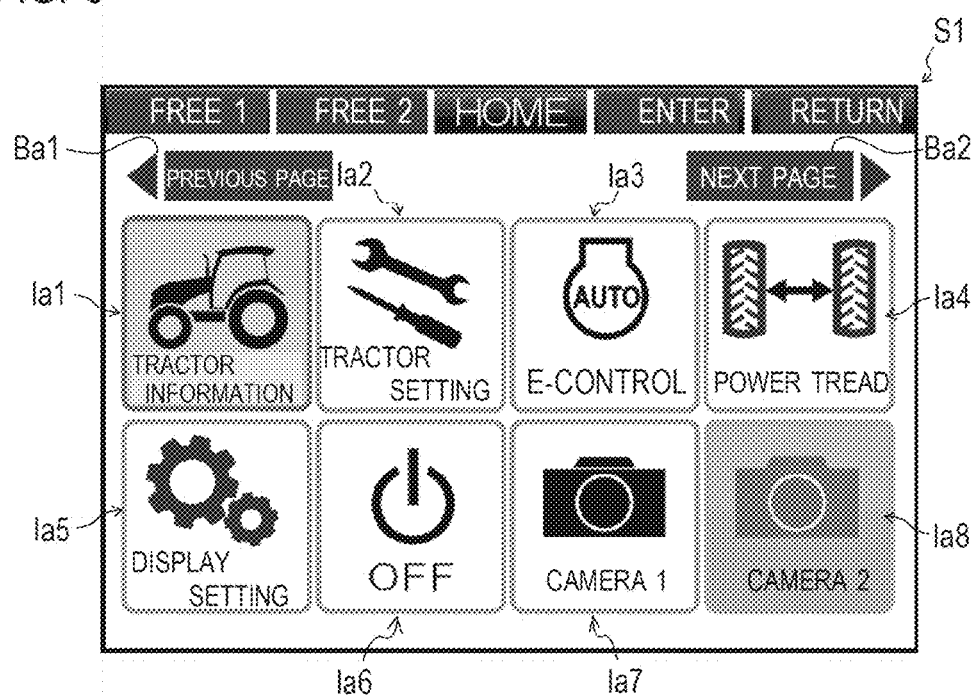
FIG. 8 is a diagram showing a home screen displayed on the second display device of the tractor.

In step S460, the control apparatus 45 starts a regeneration operation whose manner of regeneration is the recovery regeneration, and ends the forced regeneration process B and proceeds to step S110 (see FIG. 8).

Next, with reference to FIGS. 12 to 19, a description will be given of the operation manner of the meter panel 30 of the tractor 1 and the indication manner of the first display device 42 and the second display device 28. Firstly, a description will be given of the state display screen which is the basic screen that the meter panel 30 normally displays.

Figure 12:
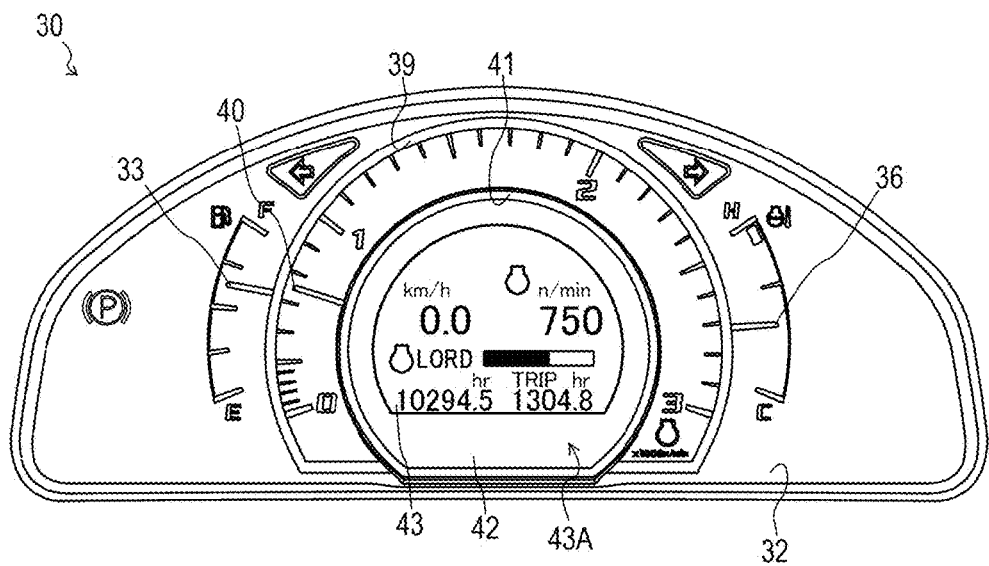
FIG. 12 is a diagram showing the indication manner of the meter panel in the case where a state display screen is displayed in the tractor.

As shown in FIG. 12, when the key switch 27 (see FIG. 9) is turned ON, the meter panel control apparatus 44 determines the state display screen to be displayed, based on the type of the state display screen previously displayed when the key switch 27 was in the OFF state (hereinafter simply referred to as "the previous display screen").

As shown in FIG. 13, the state display screen includes an hour meter screen 43A, a set value display screen 43B, an average mileage/operable time screen 43C, and a maintenance set screen 43D. The various types of the state display screen are similar to one another in displaying: "N" at the screen upper level as a reverser lever position indication 43α when the reverser lever 26 is at the N position; and the vehicle speed of the tractor 1 and the rotation speed of the engine 3 at the screen middle level as a speed indication 43 of the tractor 1. At the screen lower level of the state display screen, one of an hour meter indication 43y, a set value indication 436, an average mileage/operable time indication 436, and a maintenance set indication 43C is selectively displayed.

Figure 13A:
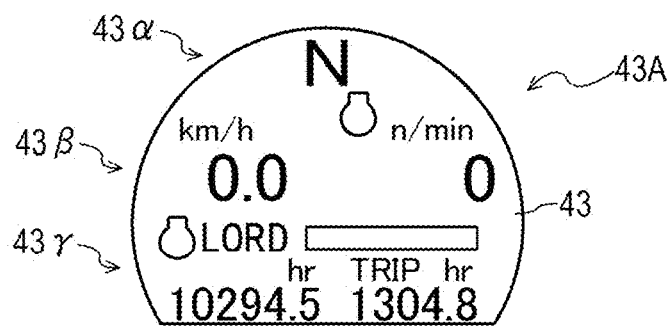
FIG. 13A is a diagram showing an hour meter screen displayed on a first display device disposed in the meter panel of the tractor.

As shown in FIG. 13A, the hour meter screen 43A is the screen that displays the operation time of the tractor 1. The hour meter screen 43A displays, at the screen lower level of the first display device 42 as the hour meter indication 43y, the load factor of the engine 3, the hour meter showing the cumulative operation time of the tractor 1, and the trip meter showing the cumulative operation time since arbitrarily set timing.

Figure 13B:
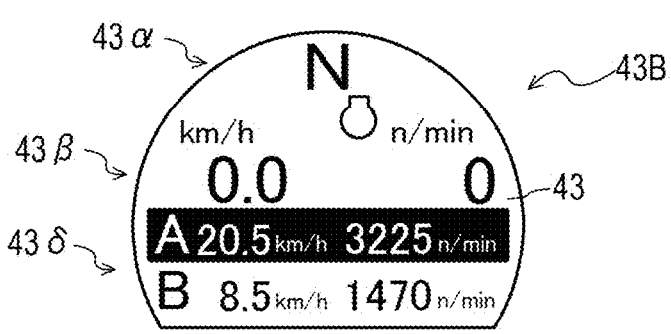
FIG. 13B is a diagram showing a set value display screen displayed on the first display device disposed in the meter panel of the tractor.

As shown in FIG. 13B, the set value display screen 43B is the screen that limits the maximum engine rotation speed of the tractor 1. The set value display screen 43B displays, at the screen lower level of the first display device 42 as the set value indication 436, the maximum rotation speed of the engine 3 and the maximum vehicle speed simultaneously in each of an A mode which is applied when the work machine is mainly used and a B mode which is applied when the work machine is not used. In the set value display screen, the maximum rotation speed of each mode can be changed by a signal from any not-shown operational component. Similarly, the set value display screen can be switched to a screen for limiting the maximum rotation speed of the not-shown PTO shaft in the A mode and in the B mode. In the screen for limiting the maximum rotation speed of the PTO shaft, by changing the maximum rotation speed of the PTO shaft in each mode, the rotation speed of the PTO shaft from the first to fourth gears is displayed.

Figure 13C:
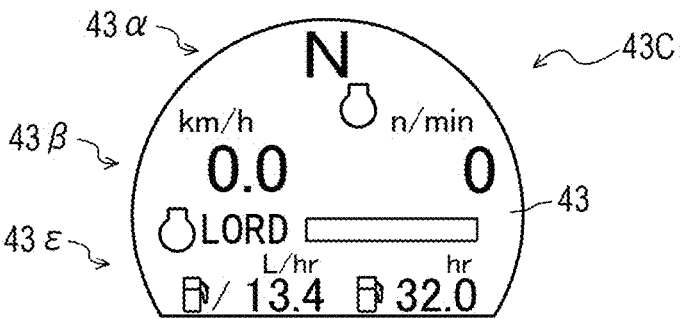
FIG. 13C is a diagram showing an average mileage/operable time screen displayed on the first display device disposed in the meter panel of the tractor.

As shown in FIG. 13C, the average mileage/operable time screen 43C is the screen for limiting the maximum engine rotation speed of the tractor 1. The average mileage/operable time screen 43C displays, at the screen lower level of the first display device 42 as the average mileage/operable time indication 436, the load factor of the engine 3, the average mileage of the tractor 1, and the operable time with the average mileage or an upward arrow indicative of the engine being capable of driving longer than the set time.

Figure 13D:
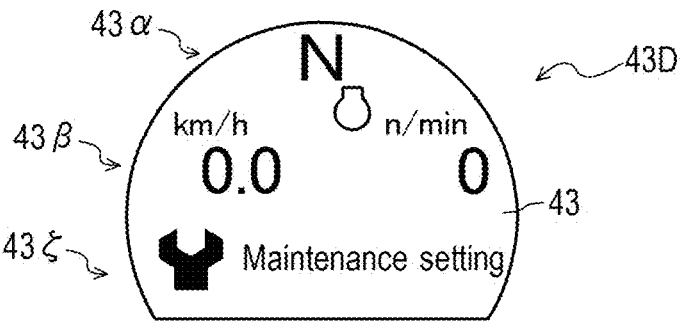
FIG. 13D is a diagram showing a maintenance set screen displayed on the first display device disposed in the meter panel of the tractor.

As shown in FIG. 13D, the maintenance set screen 43D is the screen for setting the timing of various types of maintenance of the tractor 1. The maintenance set screen displays, at the screen lower level of the first display device 42 as the maintenance set indication 43C, information indicating that the current mode is the maintenance set mode. The maintenance set screen is the screen for displaying or setting the timing of replacing consumables that require periodical replacement such as the engine oil, the transmission oil, the front axle oil, the engine oil filter and the like. In the maintenance set screen 43D, the replacement timing can be reset when replacement of any consumable is finished, by inputting a signal from a not-shown operational component indicative of the finished replacement. When the replacement timing of any consumable (e.g., the engine oil) arrives and when the key switch 27 is turned ON, the meter panel control apparatus 44 displays, at the screen lower level of the first display device 42 as the maintenance message, text information "Replace Engine Oil" and a symbol that represents maintenance.

In the case where the previous display screen cannot be specified (not stored), the meter panel control apparatus 44 displays the hour meter screen 43A. When the previous display screen is not the maintenance set screen 43D, the meter panel control apparatus 44 displays the screen identical to the previous display screen. Further, in the case where the previous display screen is the maintenance set screen 43D and the rotation speed of the engine 3 is equal to or greater than the reference value, the meter panel control apparatus 44 displays the hour meter screen 43A. In the case where the previous display screen is the maintenance set screen 43D and the rotation speed is less than the reference value, the meter panel control apparatus 44 displays the maintenance set screen 43D. Upon receipt of a switch signal from a not-shown changing switch, the meter panel control apparatus 44 switches the state display screen to arbitrary state display screen. Similarly, upon receipt of a signal indicative of the end of a regeneration operation from the control apparatus 45, the meter panel control apparatus 44 displays one of the state display screens 43A, 43B, 43C, 43D on the first display device 42.

In the following, with reference to FIGS. 14 to 19, a description will be given of the indication manner of the meter panel 30 (the first display device 42), the indication manner of the second display device 28, and the operation manner of the regeneration operation switch 31, each relating to regeneration operations.

The control apparatus 45 controls the lighting manner of the regeneration operation switch 31, and transmits a signal as to a regeneration operation to the meter panel control apparatus 44. The meter panel control apparatus 44 controls indication of the regeneration operation indicator 34A, indication of the alert indicator 35, and display of the first display device 42.

Figure 14:
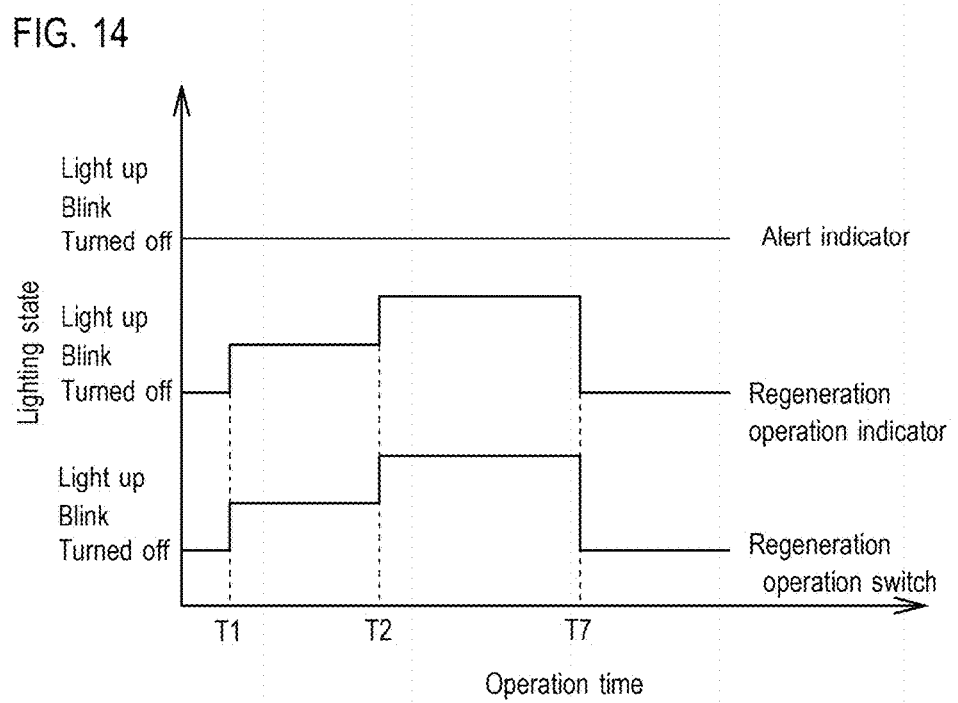
FIG. 14 is a graph showing the lighting manner of the indicators displayed on the meter panel and that of a regeneration operation switch in an assist regeneration operation mode of the tractor.

As shown in FIG. 14, in the case where the necessity of performing a regeneration operation whose manner of regeneration is the reset regeneration, the stationary regeneration, or the recovery regeneration arises, and where it is capable of performing that regeneration operation, the control apparatus 45 causes the regeneration operation switch 31 to blink. Further, in the case where a regeneration operation whose manner of regeneration is the reset regeneration, the stationary regeneration or the recovery regeneration is being performed, the control apparatus 45 causes the regeneration operation switch 31 to light up.

In the case where the necessity of performing a regeneration operation whose manner of regeneration is the reset regeneration, the stationary regeneration, or the recovery regeneration arises, the meter panel control apparatus 44 causes the regeneration operation indicator 34A, or the regeneration operation indicator 34A and the alert indicator 35 to blink, and displays, on the first display device 42, information on the operations necessary for performing the regeneration operation. Further, in the case where a regeneration operation whose manner of regeneration is the reset regeneration, the stationary regeneration, or the recovery regeneration is being performed, the meter panel control apparatus 44 causes the regeneration indicator, or the regeneration operation indicator 34A and the alert indicator 35 to light up, and displays, on the first display device 42, information on the performing state of the regeneration operation.

In addition, in the case where the manner of a regeneration operation is the stationary regeneration or the recovery regeneration which can be performed only while the tractor 1 stops, the meter panel control apparatus 44 causes the regeneration operation indicator 34A and the alert indicator 35 to blink or to light up. Further, in the case where the manner of a regeneration operation is the reset regeneration which can be performed while the tractor is in operation, the meter panel control apparatus 44 causes only the regeneration operation indicator 34A to blink or to light up.

Specifically, in the case where the manner of a regeneration operation is the self-regeneration or the assist regeneration, the control apparatus 45 does not cause the regeneration operation switch 31 to blink nor to light up. Similarly, the meter panel control apparatus 44 does not cause the regeneration operation indicator 34A and the alert indicator 35 to blink nor to light up. That is, a regeneration operation whose manner of regeneration is the self-regeneration or the assist regeneration is performed in the state where the regeneration operation switch 31, the regeneration operation indicator 34A, and the alert indicator 35 are turned off.

Figure 15A:
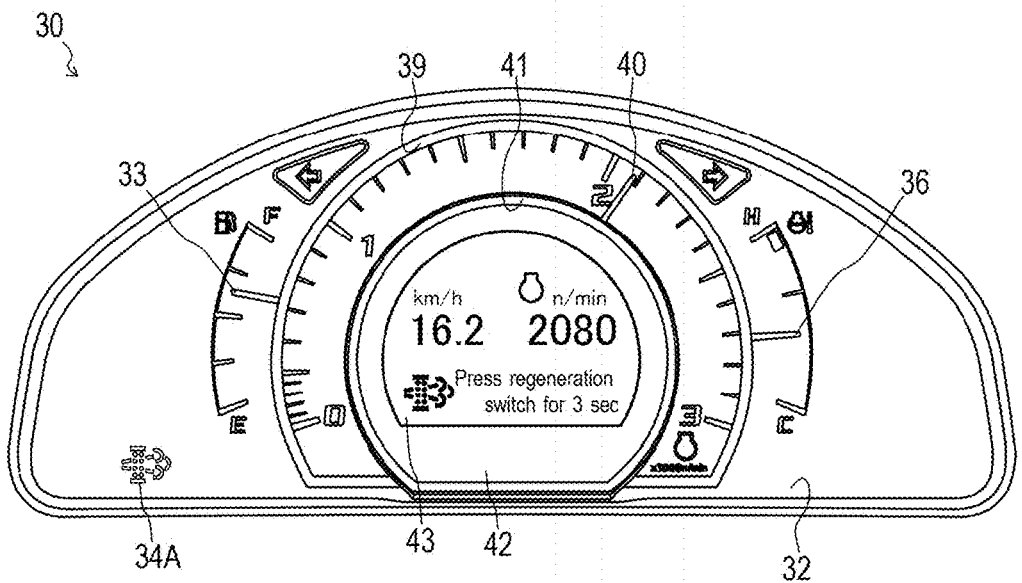
FIG. 15A is a diagram showing the indication manner of the meter panel in an assist regeneration operation request mode of the tractor.

In the case where the manner of a regeneration operation is the reset regeneration, when the control apparatus 45 determines that a predetermined condition for performing a regeneration operation in the manner of the reset regeneration is satisfied (see FIG. 10), the control apparatus 45 transmits, to the meter panel control apparatus 44, a signal indicating that the regeneration operation in the manner of the reset regeneration is necessary. Further, the control apparatus 45 causes the regeneration operation switch 31 to blink (time T1 in FIG. 14). As shown in FIG. 15A, upon acquisition of the signal from the control apparatus 45, the meter panel control apparatus 44 causes the regeneration operation indicator 34A to blink (time T1 in FIG. 14). Further, the meter panel control apparatus 44 displays, on the first display device 42, a message relating to the operation necessary for performing the regeneration operation (e.g., "Press Regeneration Switch for 3 sec") and a symbol.

Figure 16A:
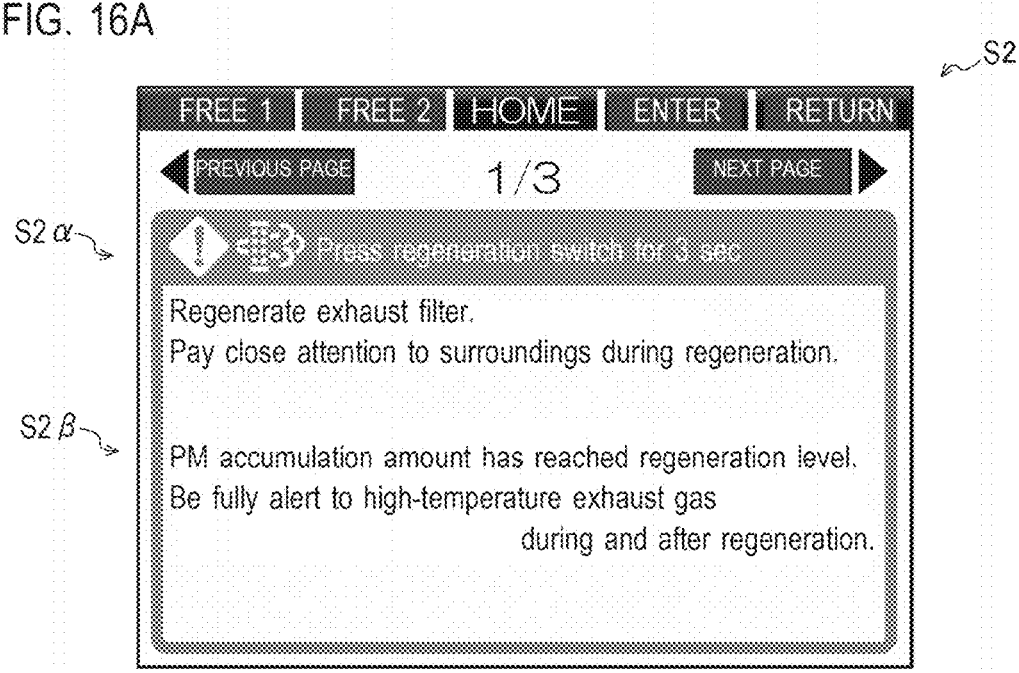
FIG. 16A is a diagram showing an alert screen S2 which is displayed on the second display device in the assist regeneration operation request mode of the tractor.

At this time, as shown in FIG. 16A, the control apparatus 45 switches the screen shown on the second display device 28 (e.g., the home screen S1) to an alert screen S2. Then, the control apparatus 45 displays, on a message display part S2α of the alert screen S2, a message "Press Regeneration Switch for 3 sec" and a symbol which are identical to those displayed on the first display device 42. Further, the control apparatus 45 displays, on a detailed information display part S2β of the alert screen S2, detailed information on the regeneration operation not shown on the first display device 42, namely, a message prompting the regeneration operation, cautions in performing the regeneration operation, the state of the exhaust gas purification apparatus and the like.

Figure 15B:
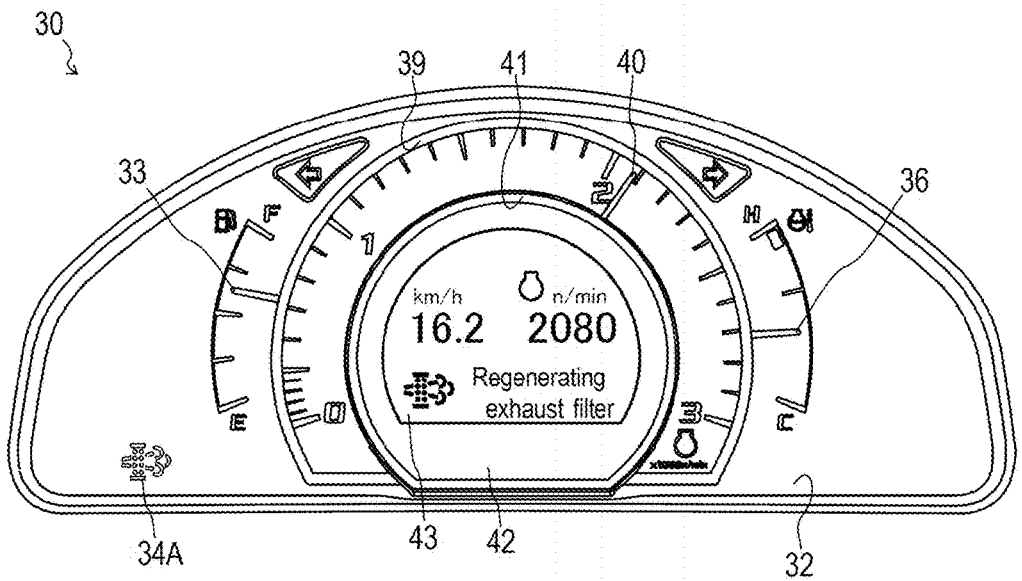
FIG. 15B is a diagram showing the indication manner of the meter panel in the assist regeneration operation mode of the tractor.

As shown in FIG. 14, when the regeneration operation switch 31 is pushed for a period longer than a predetermined time (e.g., 3 sec), the control apparatus 45 starts a regeneration operation in the manner of the reset regeneration. Simultaneously, the control apparatus 45 causes the regeneration operation switch 31 to light up (time T2 in FIG. 14). Further, the control apparatus 45 transmits, to the meter panel control apparatus 44, a signal indicative of the start of the regeneration operation. As shown in FIG. 15B, upon acquisition of the signal from the control apparatus 45, the meter panel control apparatus 44 causes the regeneration operation indicator 34A to light up (time T2 in FIG. 14). Further, the meter panel control apparatus 44 displays, on the first display device 42, a message informing that the regeneration operation is being performed (e.g., "Regenerating Exhaust Filter") and a symbol.

Figure 16B:
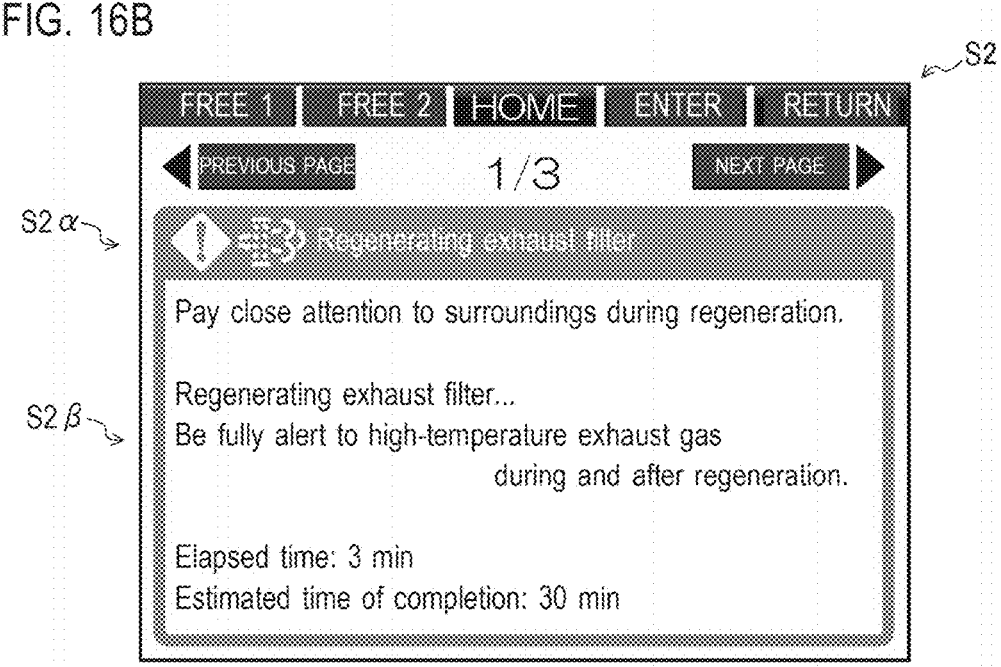
FIG. 16B is a diagram showing the alert screen S2 which is displayed on the second display device in the assist regeneration operation mode of the tractor.

At this time, as shown in FIG. 16B, the control apparatus 45 changes the contents of the alert screen S2 displayed on the second display device 28. When the regeneration operation switch 31 is pushed for a period longer than a predetermined time, the control apparatus 45 causes the message display part S2α of the alert screen S2 to display a message "Regenerating Exhaust Filter" and a symbol which are identical to those displayed on the first display device 42. Further, the control apparatus 45 displays, on the detailed information display part S2β of the alert screen S2, information on the regeneration operation not shown on the first display device 42, namely, cautions during the regeneration operation, elapsed time, estimated time until the end of the regeneration operation and the like.

Figure 18A:
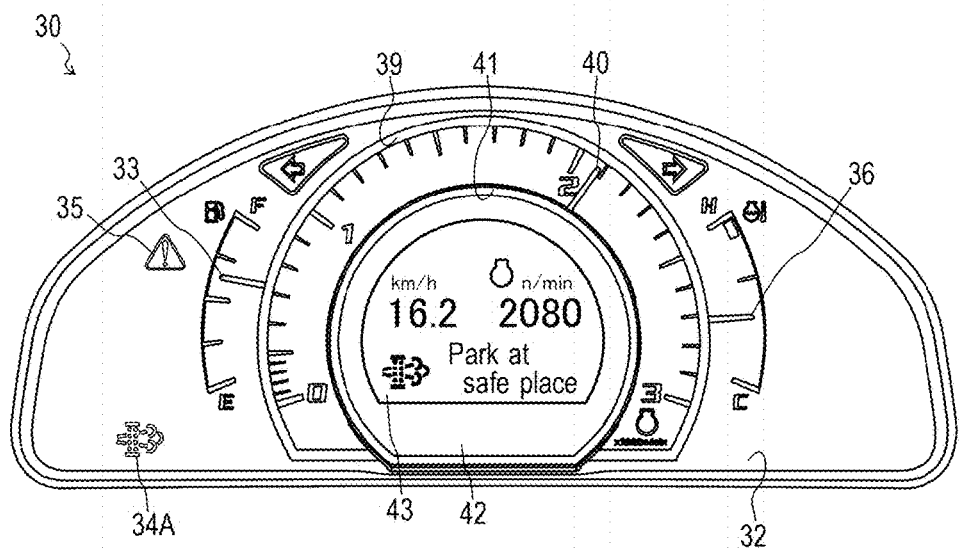
FIG. 18A is a diagram showing the indication manner of the meter panel in the stationary regeneration operation request mode of the tractor.

As shown in FIG. 17, in the case where the manner of a regeneration operation is the stationary regeneration, when the control apparatus 45 determines that a predetermined condition for performing a regeneration operation in the manner of the stationary regeneration is satisfied (see FIG. 11), the control apparatus 45 transmits, to the meter panel control apparatus 44, a signal indicating that the regeneration operation in the manner of the stationary regeneration is necessary. As shown in FIG. 18A, upon acquisition of the signal from the control apparatus 45, the meter panel control apparatus 44 causes the regeneration operation indicator 34A and the alert indicator 35 to blink (time T3 in FIG. 17). Further, the meter panel control apparatus 44 displays, on the first display device 42, a message relating to the operation necessary for performing the regeneration operation (e.g., alternately displaying operation messages "Stop Work" and "Park at Safe Place") and a symbol.

Figure 19A:
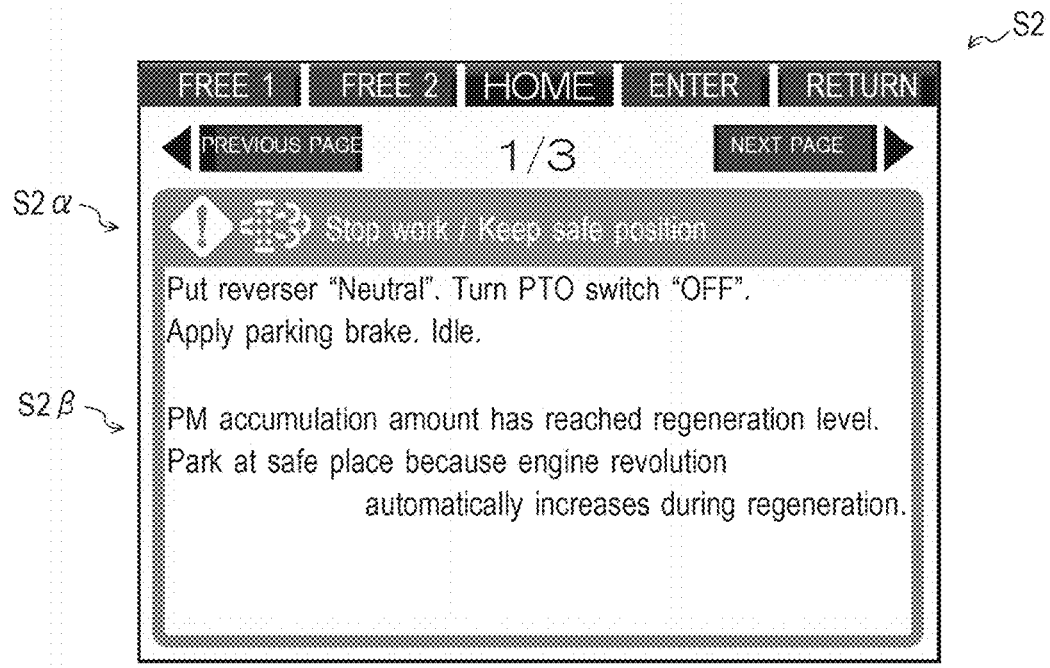
FIG. 19A is a diagram showing the alert screen S2 which is displayed on the second display device in the stationary regeneration operation request mode of the tractor.
Figure 19B:
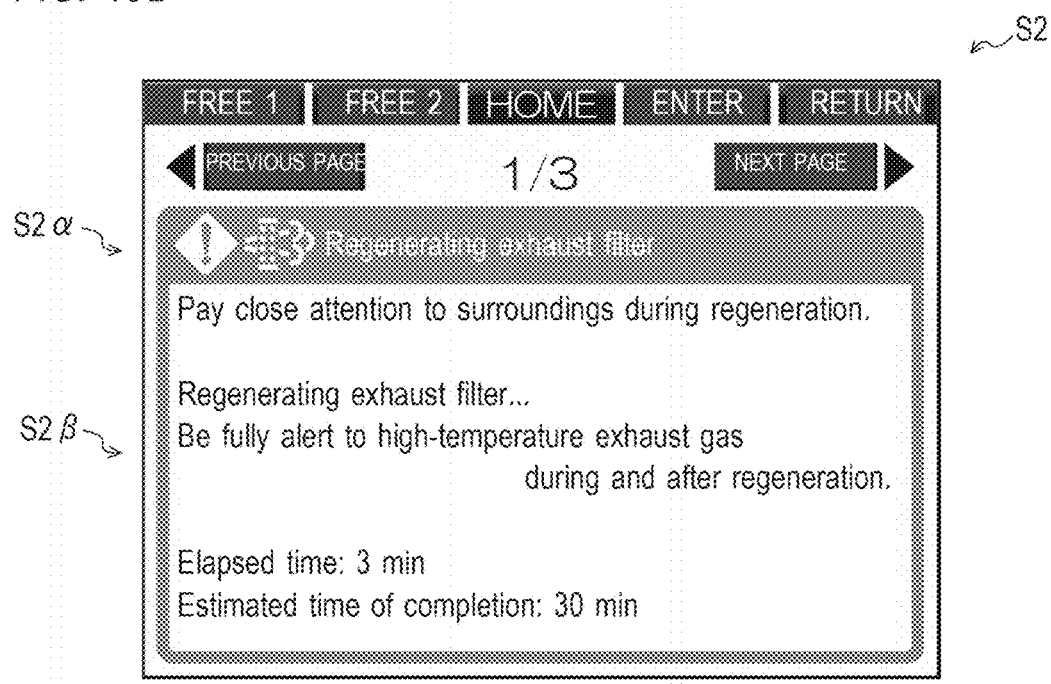
FIG. 19B is a diagram showing the alert screen S2 which is displayed on the second display device in the stationary regeneration operation mode of the tractor.

At this time, as shown in FIG. 19A, the control apparatus 45 switches the screen shown on the second display device 28 (e.g., the home screen S1) to the alert screen S2. Then, the control apparatus 45 displays, on the message display part S2α of the alert screen S2, a message "Stop Work, Keep Safe Position" and a symbol which are identical to those displayed on the first display device 42. Further, the control apparatus 45 displays, on the detailed information display part S2β of the alert screen S2, detailed information on the regeneration operation not shown on the first display device 42, namely, an operation necessary for performing the regeneration operation, cautions in performing the regeneration operation, the state of the exhaust gas purification apparatus and the like.

The control apparatus 45 determines whether or not the condition for performing the regeneration operation in the manner of the stationary regeneration is satisfied. Specifically, the control apparatus 45 determines whether the reverser lever 26 is at the N position, whether the not-shown PTO switch is turned OFF, whether a not-shown parking brake is actuated, and whether the engine 3 is in the idle state. In the case where the regeneration operation switch 31 is pushed when at least one of the conditions of the state of the reverser lever 26, the state of the PTO switch, the state of the parking brake, and the state of the engine 3 is not satisfied, the control apparatus 45 does not allow the regeneration operation in the manner of the stationary regeneration to be performed. Further, the control apparatus 45 transmits a signal indicative of the situation to the meter panel control apparatus 44. Upon acquisition of the signal from the signal from the control apparatus 45, the meter panel control apparatus 44 displays, on the first display device 42, a message relating to the operation necessary for performing the regeneration operation (e.g., display operation messages "Put Reverser Neutral", "Turn Off PTO Switch", "Apply Parking Brake" and "Idle" according to priorities) and a symbol.

When the control apparatus 45 determines that a regeneration operation can be performed in the manner of the stationary regeneration with the above-described conditions being satisfied (see FIG. 11), the control apparatus 45 transmits, to the meter panel control apparatus 44, a signal indicating that the regeneration operation in the manner of the stationary regeneration can be performed. Further, the control apparatus 45 causes the regeneration operation switch 31 to blink (time T4 in FIG. 17). Upon acquisition of the signal from the control apparatus 45, the meter panel control apparatus 44 displays, on the first display device 42, a message relating to the operation necessary for performing the regeneration operation (e.g., "Press Regeneration Switch for 3 sec") and a symbol. At this time, the control apparatus 45 switches the content of the alert screen S2 displayed on the second display device 28 to the content of the alert screen S2 shown in FIG. 16A.

Figure 18B:
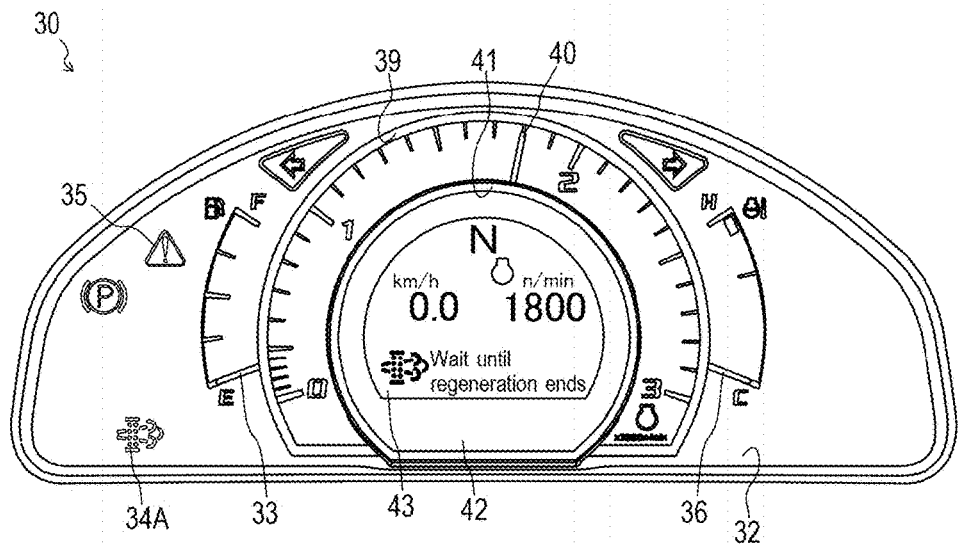
FIG. 18B is a diagram showing the indication manner of the meter panel in the stationary regeneration operation mode of the tractor.

When the regeneration operation switch 31 is pushed for a period longer than a predetermined time (e.g., 3 sec), the control apparatus 45 starts a regeneration operation in the manner of the stationary regeneration. Simultaneously, the control apparatus 45 causes the regeneration operation switch 31 to light up (time T5 in FIG. 17). Further, the control apparatus 45 transmits a signal indicative of the start of the regeneration operation to the meter panel control apparatus 44. As shown in FIG. 18B, upon acquisition of the signal from the control apparatus 45, the meter panel control apparatus 44 causes the alert indicator 35 and the regeneration operation indicator 34A to light up (time T5 in FIG. 17). Further, the meter panel control apparatus 44 displays, on the first display device 42, a message informing that the regeneration operation is being performed (e.g., alternately displaying operation messages "Regenerating Exhaust Filter" and "Wait Until Regeneration Ends") and a symbol. At this time, the control apparatus 45 switches the content of the alert screen S2 displayed on the second display device 28 to the content of the alert screen S2 shown in FIG. 19B.

In the case where the manner of a regeneration operation is the recovery regeneration, when the control apparatus 45 determines that a predetermined condition for performing the regeneration operation in the manner of the recovery regeneration is satisfied, that is, when the control apparatus 45 determines that a predetermined condition for ending the regeneration operation is not satisfied despite a regeneration operation in the manner of the stationary regeneration being performed (see FIG. 11), the control apparatus 45 starts a regeneration operation in the manner of the recovery regeneration. Simultaneously, the control apparatus 45 causes the regeneration operation switch 31 to continuously light up (time T6 in FIG. 17). Further, the control apparatus 45 transmits, to the meter panel control apparatus 44, a signal indicative of the start of the regeneration operation in the manner of the recovery regeneration. Upon acquisition of the signal from the control apparatus 45, the meter panel control apparatus 44 causes the alert indicator 35 and the regeneration operation indicator 34A to continuously light up (time T6 in FIG. 17). Further, the meter panel control apparatus 44 displays, on the first display device 42, a message informing that the regeneration operation is continuously being performed (e.g., alternately displaying operation messages "Regenerating Exhaust Filter" and "Wait Until Regeneration Ends") and a symbol.

In the case where the manner of a regeneration operation is the reset regeneration, the stationary regeneration, or the recovery regeneration, when the predetermined condition for ending the regeneration operation is satisfied (see FIGS. 10 and 11), the control apparatus 45 ends the regeneration operation. Simultaneously, the control apparatus 45 turns off the regeneration operation switch 31 (time T7 in FIGS. 14 and 17). Further, the control apparatus 45 transmits a signal, to the meter panel control apparatus 44, a signal indicative of the end of the regeneration operation. Upon acquisition of the signal from the control apparatus 45, the meter panel control apparatus 44 turns off the alert indicator 35 and the regeneration operation indicator 34A (time T7 in FIGS. 14 and 17). Further, the meter panel control apparatus 44 displays the previous display screen displayed on the first display device 42 (see FIG. 13). At this time, the control apparatus 45 switches the alert screen S2 displayed on the second display device 28 to the previous display screen (e.g., the home screen S1).

In such a structure, at least one alert out of the regeneration operation indicator 34A and the alert indicator 35 blinks, and a message is displayed on the first display device 42. Further, the regeneration operation switch 31 provided at the surface opposing to the operator seat 19 of the steering column 29 blinks. Accordingly, in the tractor 1, highly visually recognizable blinking of the regeneration operation indicator 34A, the alert indicator 35, and the regeneration operation switch 31 indicates the necessity of performing a regeneration operation. Further, the first display device 42 specifically displays information on the regeneration operation. In addition, the second display device displays detailed contents of the regeneration operation not displayed on the first display device 42. Thus, the regeneration operation indicator 34A, the alert indicator 35, and the first display device 42 display minimum information on the regeneration operation, and the second display device 28 displays supplemental information on the regeneration operation. Thus, the operator can be quickly informed of the necessity of performing a regeneration operation, and provided with detailed information on the regeneration operation.

INDUSTRIAL APPLICABILITY

The present invention is applicable to a work vehicle that includes an exhaust gas purification apparatus.

DESCRIPTION OF REFERENCE SIGNS

1: Tractor
3: Engine
4: Exhaust gas purification apparatus
19: Operator seat
28: Second display device
30: Meter panel
31: Regeneration operation switch
34A: Regeneration operation indicator
35: Alert indicator
42: First display device

The invention claimed is:

1. A tractor including an exhaust gas purification apparatus for an engine, the exhaust gas purification apparatus configured to perform a regeneration operation of to oxidatively remove collected particulate matter in exhaust gas, the tractor comprising:
a meter panel that is arranged on a position where it is visible through a steering wheel, the-meter panel including:
a regeneration operation indicator configured to indicate a state where the regeneration operation is necessary or a state where the regeneration operation is being performed,
an alert indicator configured to indicate an abnormality of the tractor, and
a first display device configured to display information on the regeneration operation,
a second display device that is provided near an operator seat and that is configured to display information on the regeneration operation, wherein:
when the regeneration operation is necessary, the regeneration operation indicator, or the regeneration operation indicator and the alert indicator blink, the first display device displays message information by text on an operation necessary for performing the regeneration operation, and
when the regeneration operation is being performed, the regeneration operation indicator, or the regeneration operation indicator and the alert indicator light up, the first display device displays message information by text on a performing state of the regeneration operation and the second display device displays information on the performing state of the regeneration operation and information on the regeneration operation which is not displayed on the first display device.

2. The tractor according to claim 1, wherein:
when the regeneration operation is necessary, the second display device displays information on an operation necessary for performing the regeneration operation by text and information on the regeneration operation which is not displayed on the first display device, and
when the regeneration operation is being performed, the second display device displays information on the performing state of the regeneration operation by text.

3. The tractor according to claim 1, wherein
if the regeneration operation can be performed only while the tractor stops, the regeneration operation indicator and the alert indicator blink or light up, and
if the regeneration operation can be performed while the tractor is in operation, only the regeneration operation indicator blinks or lights up.

4. The tractor according to claim 1, further comprising:
a regeneration operation switch that is provided on a surface of a steering column which opposes to the operator seat and that is configured to at least partially light up or blink,
wherein when the regeneration operation is necessary and the regeneration operation can be performed, the regeneration operation switch blinks, and
when the regeneration operation is being performed, the regeneration operation switch lights up.

5. The tractor according to claim 2, wherein:
if the regeneration operation can be performed only while the tractor, the regeneration operation indicator and the alert indicator blink or light up, and
if the regeneration operation can be performed while the tractor is in operation, only the regeneration operation indicator blinks or lights up.

6. The tractor according to claim 2, further comprising:
a regeneration operation switch that is provided on a surface of a steering column which opposes to the operator seat and that is configured to at least partially light up or blink, wherein when the regeneration operation is necessary and the regeneration operation can be performed, the regeneration operation switch blinks, and when the regeneration operation is being performed, the regeneration operation switch lights up.

7. The tractor according to claim 3, further comprising:
a regeneration operation switch that is provided on a surface of a steering column which opposes to the operator seat and that is configured to at least partially light up or blink,
wherein when the regeneration operation is necessary and the regeneration operation can be performed, the regeneration operation switch blinks, and
when the regeneration operation is being performed, the regeneration operation switch lights up.

8. The tractor according to claim 5, further comprising:
a regeneration operation switch that is provided on a surface of a steering column which opposes to the operator seat and that is configured to at least partially light up or blink,
wherein when the regeneration operation is necessary and the regeneration operation can be performed, the regeneration operation switch blinks, and
when the regeneration operation is being performed, the regeneration operation switch lights up.

9. A work vehicle comprising:
an engine;
an exhaust gas purification apparatus coupled to the engine, the exhaust gas purification apparatus being configured to perform a regeneration operation to oxidatively remove collected particulate matter in exhaust gas; and
a control apparatus coupled to the exhaust gas purification apparatus, the control apparatus configured to, in response to a determination that the regeneration operation is necessary, initiate concurrent display of:
first operation information via a first display device, the first operation information associated with an operation necessary for performing the regeneration operation,
second operation information via a second display device, the second operation information associated with the operation necessary for performing the regeneration operation, and
first information via the second display device, the first information associated with the regeneration operation which is not displayed via the first display device; and wherein:
the first operation information comprises first message information displayed as text via the first display device; and
the second operation information comprises second message information displayed as text via the second display device.

10. The work vehicle according to claim 9, wherein the first operation information and the second operation information comprise the same operation information.

11. The work vehicle according to claim 9, wherein the control apparatus is further configured to, in response to a determination that the regeneration operation is being performed, initiate concurrent display of:
first state information via the first display device, the first state information associated with a performing state of the regeneration operation,
second state information via the second display device, the second state information associated with the performing state of the regeneration operation, and second information associated with the regeneration operation which is not displayed via the first display device.

12. The work vehicle according to claim 11, wherein:
the first state information comprises first message information displayed as text via the first display device;
the second state information comprises second message information displayed as text via the second display device; and
the first state information and the second state information comprise the same state information.

13. The work vehicle according to claim 9, further comprising:
a meter panel including a first display device; and
a second display device distinct from the meter panel, wherein:
the first display device is configured to, based on the determination that the regeneration operation is necessary, display the first operation information, and
the second display device is configured to, based on the determination that the regeneration operation is necessary, display the second operation information and the first information.

14. The work vehicle according to claim 13, wherein:
the second display device is provided near an operator seat,
the first operation information and the second operation information are the same operation information;
first state information and second state information are the same state information; and
the work vehicle comprises a tractor.

15. The work vehicle according to claim 13, wherein the meter panel further includes:
a regeneration operation indicator configured to indicate a state where the regeneration operation is necessary or a state where the regeneration operation is being performed, and
an alert indicator configured to indicate an abnormality of the work vehicle,
when the regeneration operation is necessary, the regeneration operation indicator blinks, or each of the regeneration operation indicator and the alert indicator blink; and
when the regeneration operation is being performed, the regeneration operation indicator lights up, or the regeneration operation indicator and the alert indicator light up.

16. The work vehicle according to claim 13, wherein, based on a determination that the regeneration operation is being performed:
the first display device is configured to display first state information associated with a performing state of the regeneration operation, and
the second display device is configured to display second state information associated with the performing state of the regeneration operation and third information associated with the regeneration operation which is not displayed on the first display device.

17. The work vehicle according to claim 13, further comprising:
an operator seat;
an instrument panel that includes the meter panel; and
a steering wheel positioned between the operator seat and the instrument panel;
wherein the meter panel is positioned in a first direction from the operator seat; and wherein the second display device is positioned in a second direction from the operator seat, the second direction different from the first direction.

18. A work vehicle comprising:
an engine;
an exhaust gas purification apparatus coupled to the engine, the exhaust gas purification apparatus being configured to perform a regeneration operation to oxidatively remove collected particulate matter in exhaust gas;
a meter panel including:
- a regeneration operation indicator configured to indicate a state where the regeneration operation is necessary or a state where the regeneration operation is being performed,
- an alert indicator configured to indicate an abnormality of the work vehicle, and
- a first display device configured to display first information associated with the regeneration operation; and a second display device that is provided near an operator seat and that is configured to display second information associated with the regeneration operation,
wherein:
when the regeneration operation is necessary:
- the regeneration operation indicator blinks, or each of the regeneration operation indicator and the alert indicator blink,
- the first display device displays first operation information associated with an operation necessary for performing the regeneration operation, and
- the second display device displays second operation information associated with the operation necessary for performing the regeneration operation and second information associated with the regeneration operation which is not displayed on the first display device, and when the regeneration operation is being performed:
- the regeneration operation indicator lights up, or the regeneration operation indicator and the alert indicator light up,
- the first display device displays first state information associated with a performing state of the regeneration operation, and
- the second display device displays second state information associated with the performing state of the regeneration operation and third information associated with the regeneration operation which is not displayed on the first display device.

* * * * *